(12) United States Patent
Hogg et al.

(10) Patent No.: US 8,604,726 B2
(45) Date of Patent: Dec. 10, 2013

(54) ELECTRONICALLY COMMUTATED MOTOR

(75) Inventors: Gerald Hogg, Wutach-Münchingen (DE); Arno Karwath, Deisslingen (DE)

(73) Assignee: EBM—Papst St. Georgen GmbH & Co. KG, St. Georgen (DE)

( * ) Notice: Subject to any disclaimer, the term of this patent is extended or adjusted under 35 U.S.C. 154(b) by 572 days.

(21) Appl. No.: 12/745,693

(22) PCT Filed: Nov. 20, 2008

(86) PCT No.: PCT/EP2008/009797
§ 371 (c)(1),
(2), (4) Date: Jun. 2, 2010

(87) PCT Pub. No.: WO2009/077051
PCT Pub. Date: Jun. 25, 2009

(65) Prior Publication Data
US 2010/0259203 A1    Oct. 14, 2010

(30) Foreign Application Priority Data

Dec. 18, 2007  (DE) .......................... 10 2007 063 259

(51) Int. Cl.
| H02P 1/46 | (2006.01) |
| H02P 3/18 | (2006.01) |
| H02P 6/00 | (2006.01) |
| H02P 23/00 | (2006.01) |

(52) U.S. Cl.
USPC ......... 318/139; 318/254.1; 388/815; 388/909

(58) Field of Classification Search
USPC .................. 318/139, 254.1; 388/815, 909
See application file for complete search history.

(56) References Cited

U.S. PATENT DOCUMENTS

| 4,446,414 | A |   | 5/1984  | Tupper ............................ 318/723 |
| 5,420,492 | A | * | 5/1995  | Sood et al. ....................... 318/809 |
| 5,457,375 | A | * | 10/1995 | Marcinkiewicz et al. ..... 318/802 |
| 5,463,299 | A | * | 10/1995 | Futami et al. ................... 318/618 |
| 5,933,573 | A |   | 8/1999  | Lukenich et al. .............. 318/811 |
| 6,366,483 | B1 |   | 4/2002  | Ma et al. .......................... 363/87 |
| 6,448,724 | B1 | * | 9/2002  | Kleinau et al. ........... 318/400.25 |
| 6,759,820 | B2 |   | 7/2004  | Karwath ......................... 318/254 |
| 7,102,327 | B2 |   | 9/2006  | Ho .................................. 318/812 |
| 2005/0206341 | A1 |  | 9/2005  | Ho .................................. 318/812 |

OTHER PUBLICATIONS

ETSI: EM-Compat. Standard EN 300 220-1, V2.1.1 (Apr. 2006), pp. 1-7.
Int'l Rectifier, MOSFET 3710Z datasheet.
Microchip datasheet PIC18f1330.
Microchip datasheet on dsPIC33FJ12MC201.

* cited by examiner

*Primary Examiner* — Erick Glass
(74) *Attorney, Agent, or Firm* — Milton Oliver, Esq.; Oliver Intellectual Property LLC

(57) ABSTRACT

The invention relates to a method for operating an electronically commutated motor (10) that comprises a rotor (12), a stator (14) having a multi-strand winding arrangement (16) for whose energization a power stage (18) is provided, a first lead (30) and a second lead (32) for connecting the power stage (18) to a voltage source (24), and a first controller. A first signal (U_34; U_38) is sensed, which signal characterizes a current (I_IN; I_IN'; I_M; I_M') flowing through at least one of the leads (30; 32); the first controller generates at least one clocked signal (PWM) and outputs it to the power stage (18) in order to influence the first value, permitted current. The invention also relates to a corresponding motor (10).

18 Claims, 29 Drawing Sheets

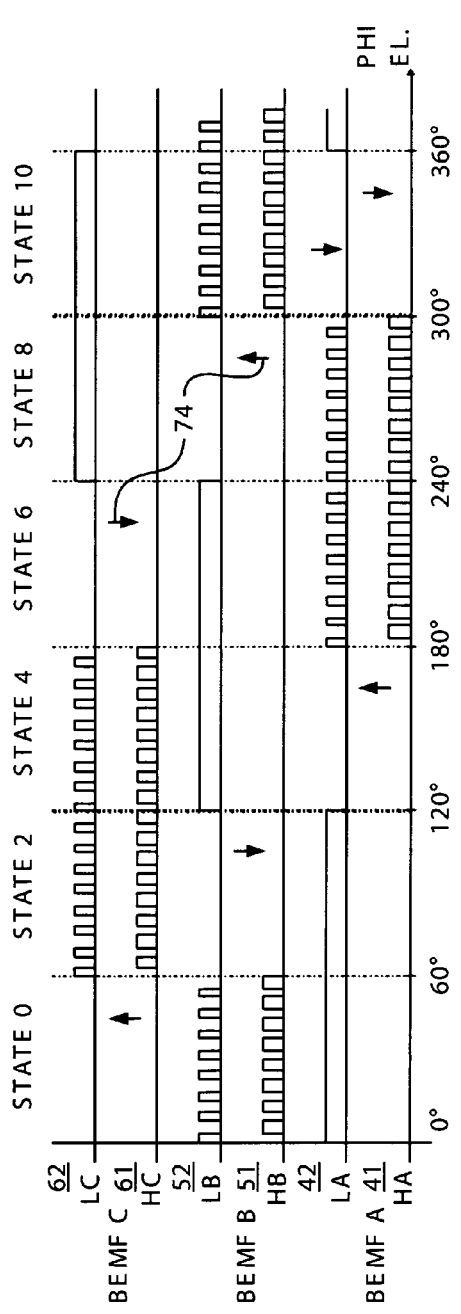
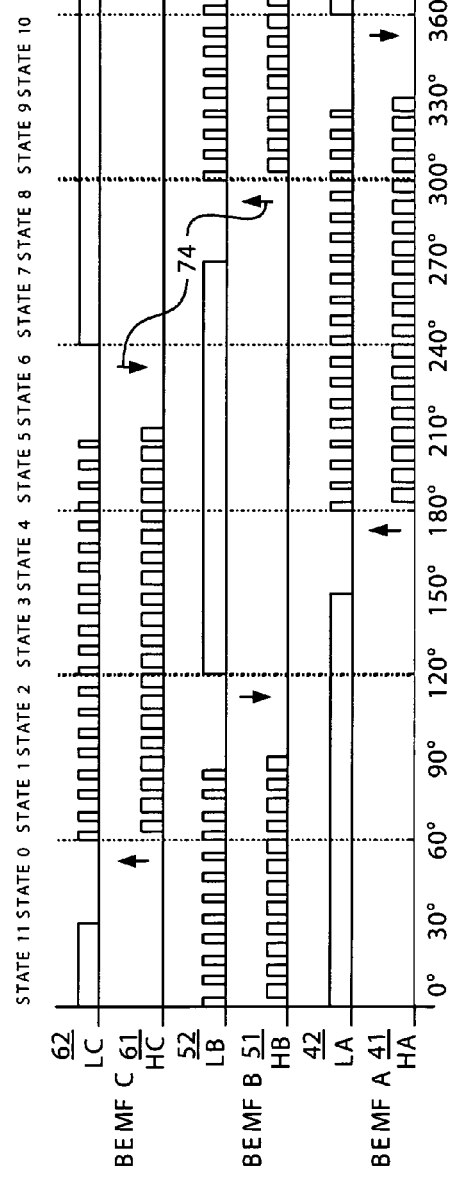

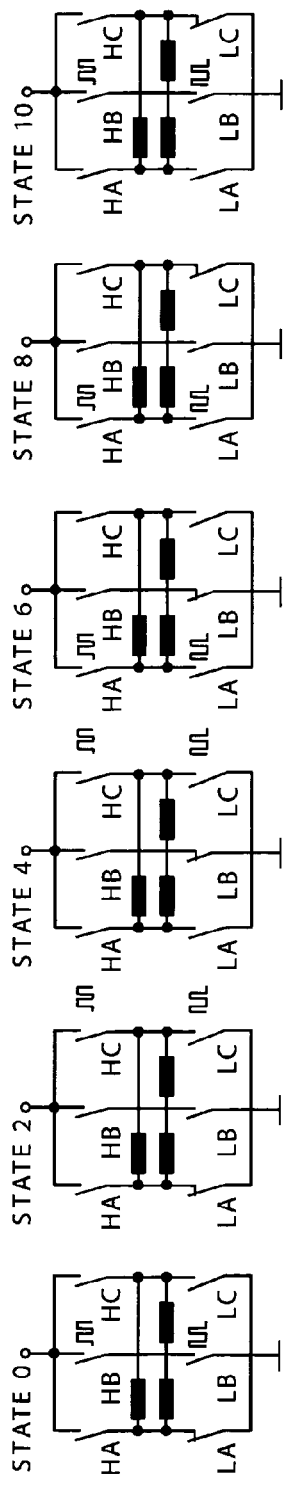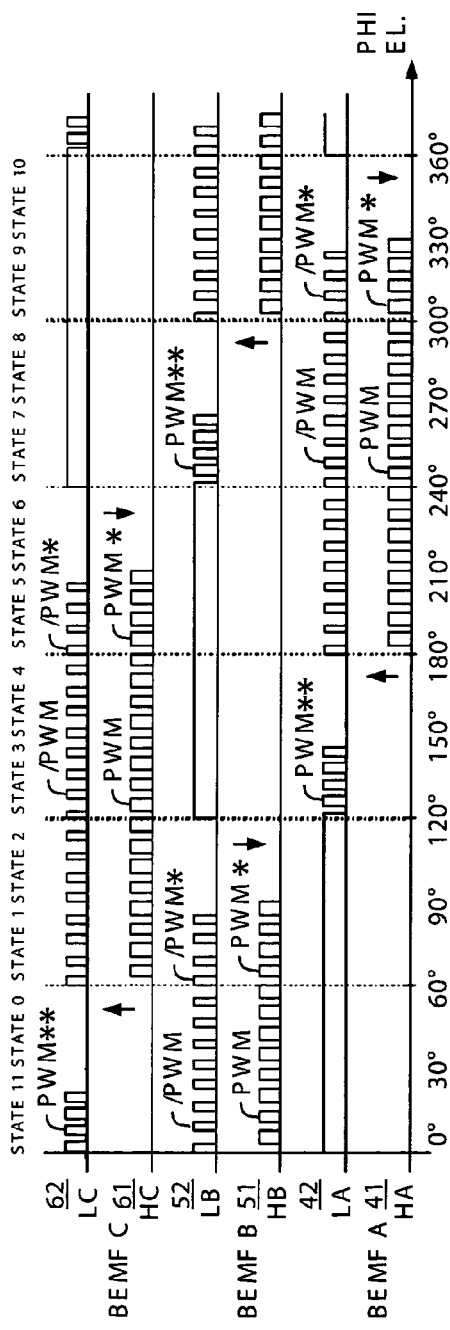
FIG. 25

US 8,604,726 B2

ELECTRONICALLY COMMUTATED MOTOR

CROSS-REFERENCE TO RELATED APPLICATIONS

The present application is a section 371 of PCT/EP08/09797, filed 20 Nov. 2008, which in turn claims priority from our German application DE 10 2007 063 259.4, filed 18 Dec. 2007, the entire content of which is hereby incorporated by reference.

FIELD OF THE INVENTION

The invention relates to an electronically commutated motor, in particular for driving a fan.

BACKGROUND

In the telecommunications sector in particular, the line-conducted emissions emitted from a fan can result in disruptions that are perceptible, for example, as troublesome noise during telephone calls. The telecommunications sector therefore requires fans having a low level of low-frequency line-conducted emissions. This is advantageous for standard motors as well.

SUMMARY OF THE INVENTION

An object is therefore to make available a novel low-emission electronically commutated motor (ECM).

This object is achieved by a method which employs several controllers to smooth fluctuations in motor current by adjustment of the duty ratio of a Pulse Width Modulation (PWM) driving signal for the power stage. Such a method and an electric motor of this kind decrease fluctuations in the average current consumed by the power stage. This also has a positive effect on the line-conducted emissions. Fewer current peaks occur because of the current controller, and as a result the power supply section can be better utilized by the customer.

BRIEF FIGURE DESCRIPTION

Further details and advantageous refinements of the invention are evident from the exemplifying embodiments, in no way to be understood as a limitation of the invention, that are described below and depicted in the drawings, in which:

FIG. 1 schematically depicts an electronically commutated motor;

FIG. 2 is a current flow diagram for a six-step commutation in the forward direction;

FIG. 3 is a current flow diagram for a twelve-step commutation in the forward direction;

Figure 16:
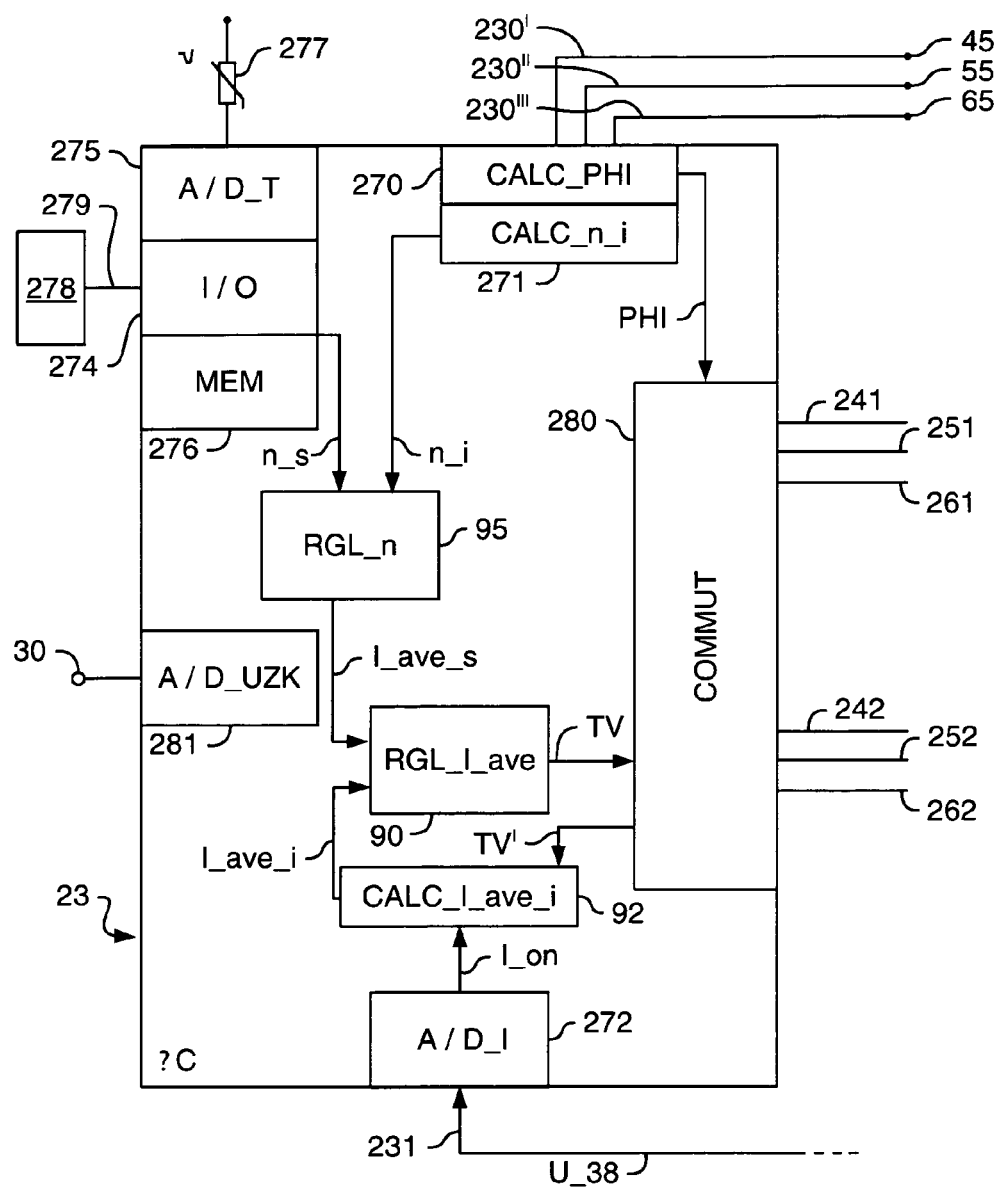
Figure 17:
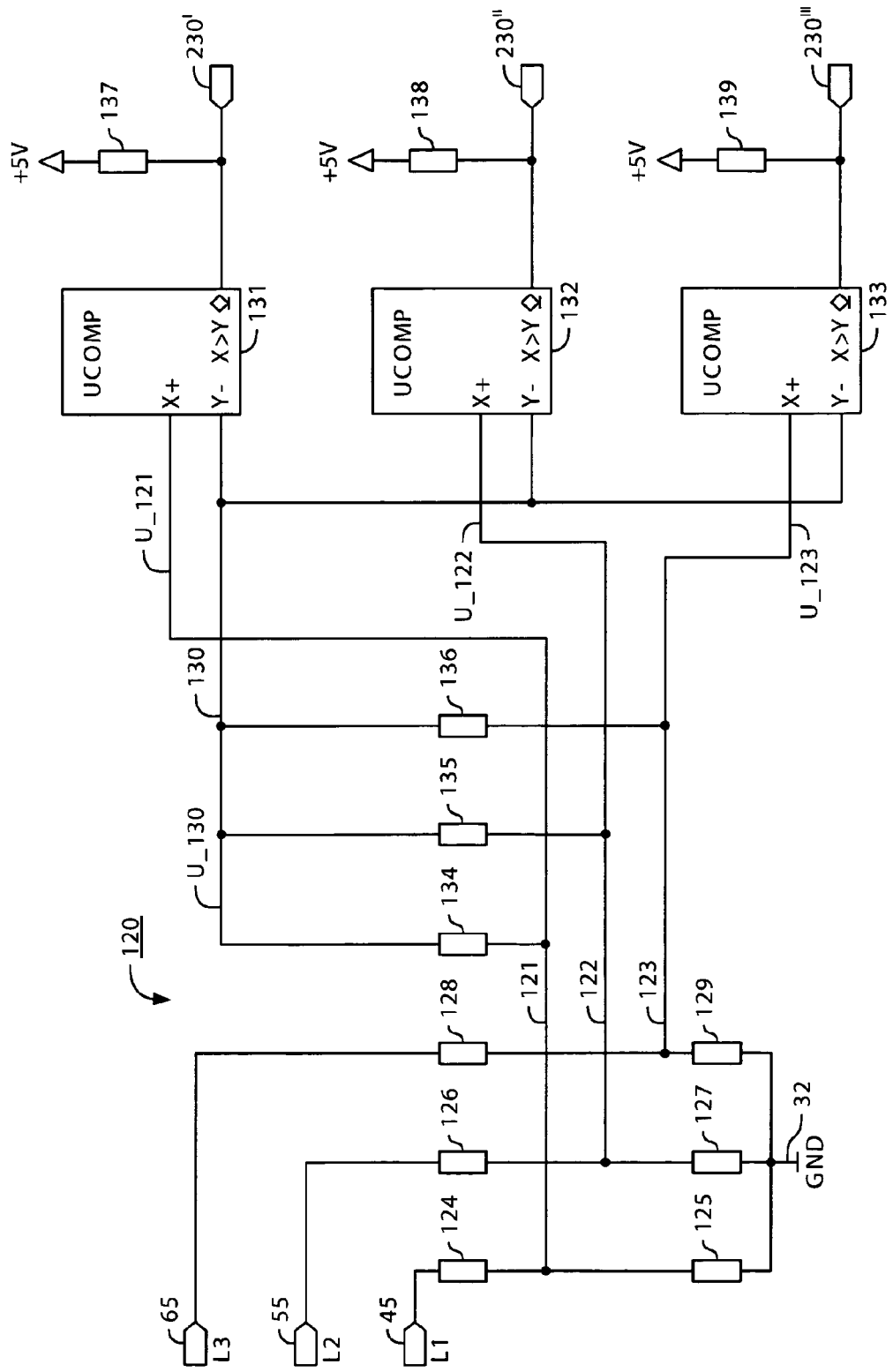
Figure 18:
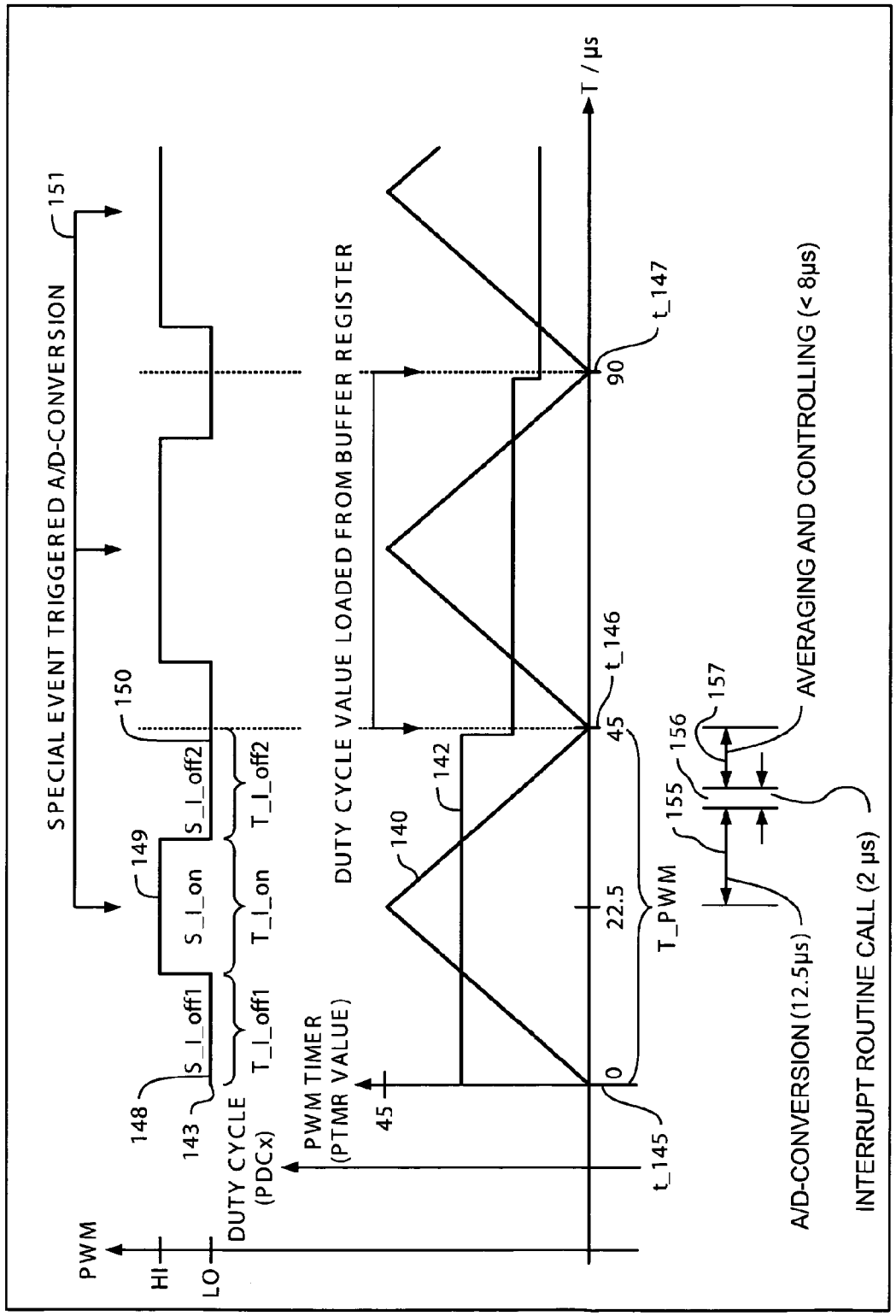
Figure 19:
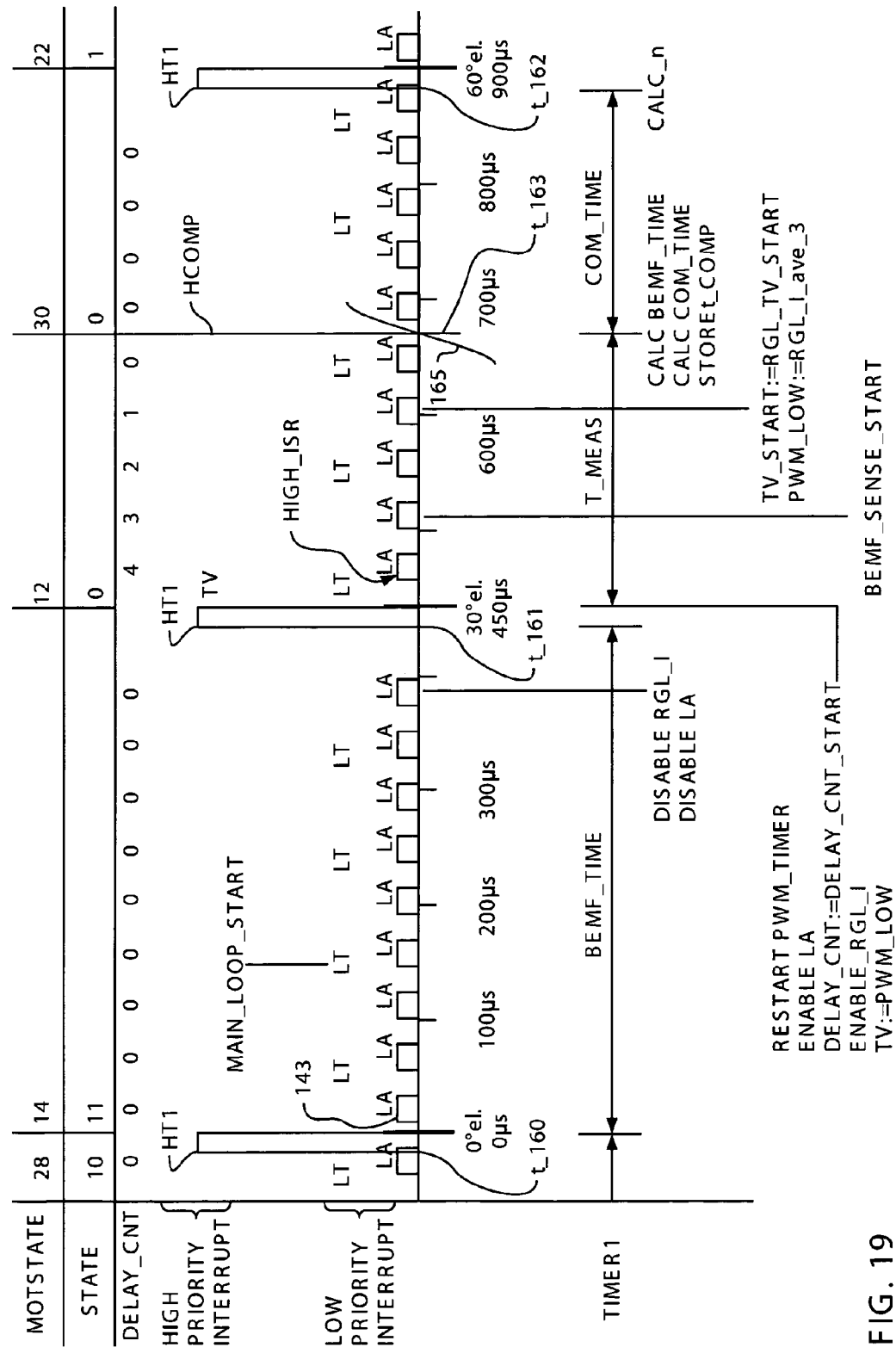
Figure 20:
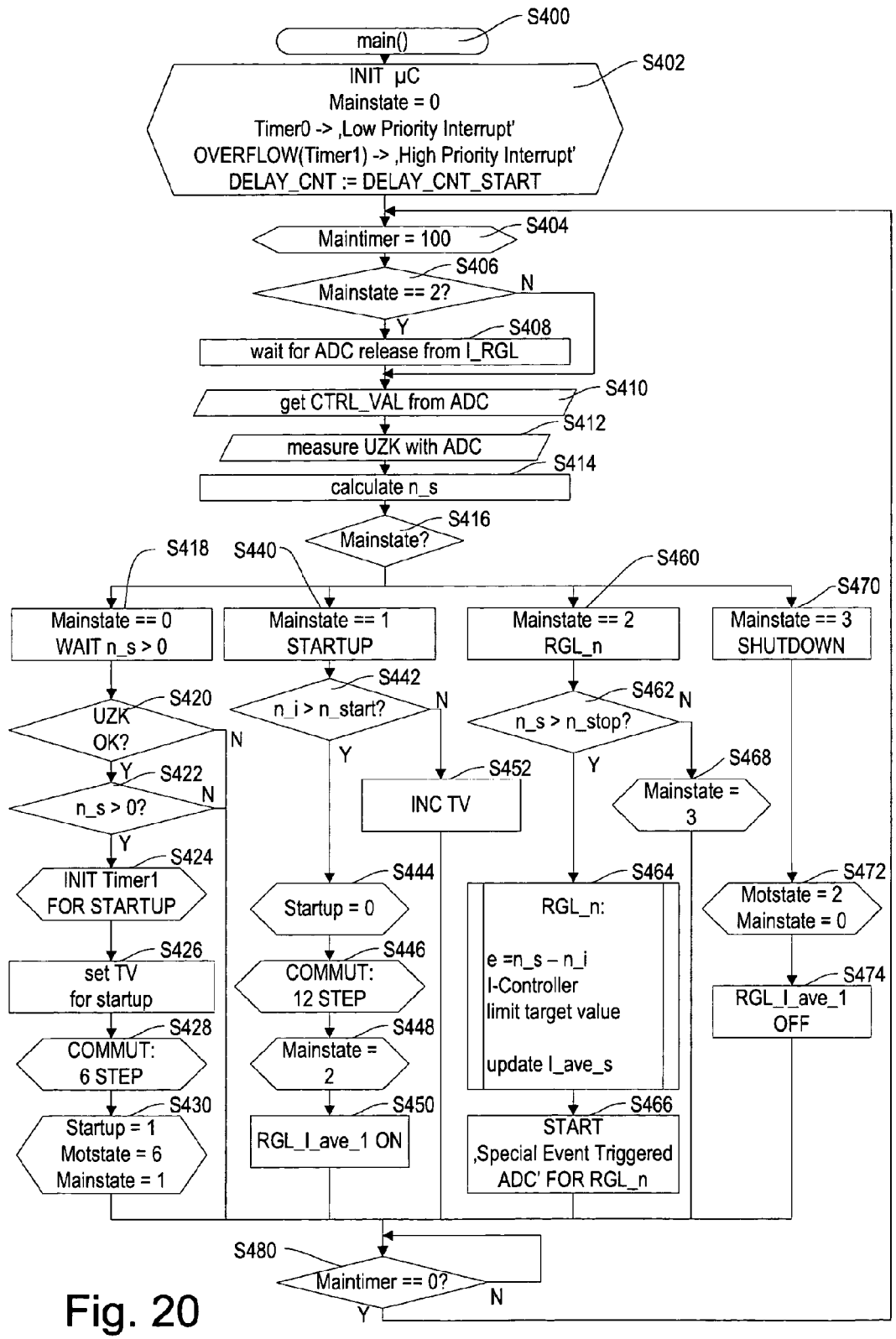
Figure 21:
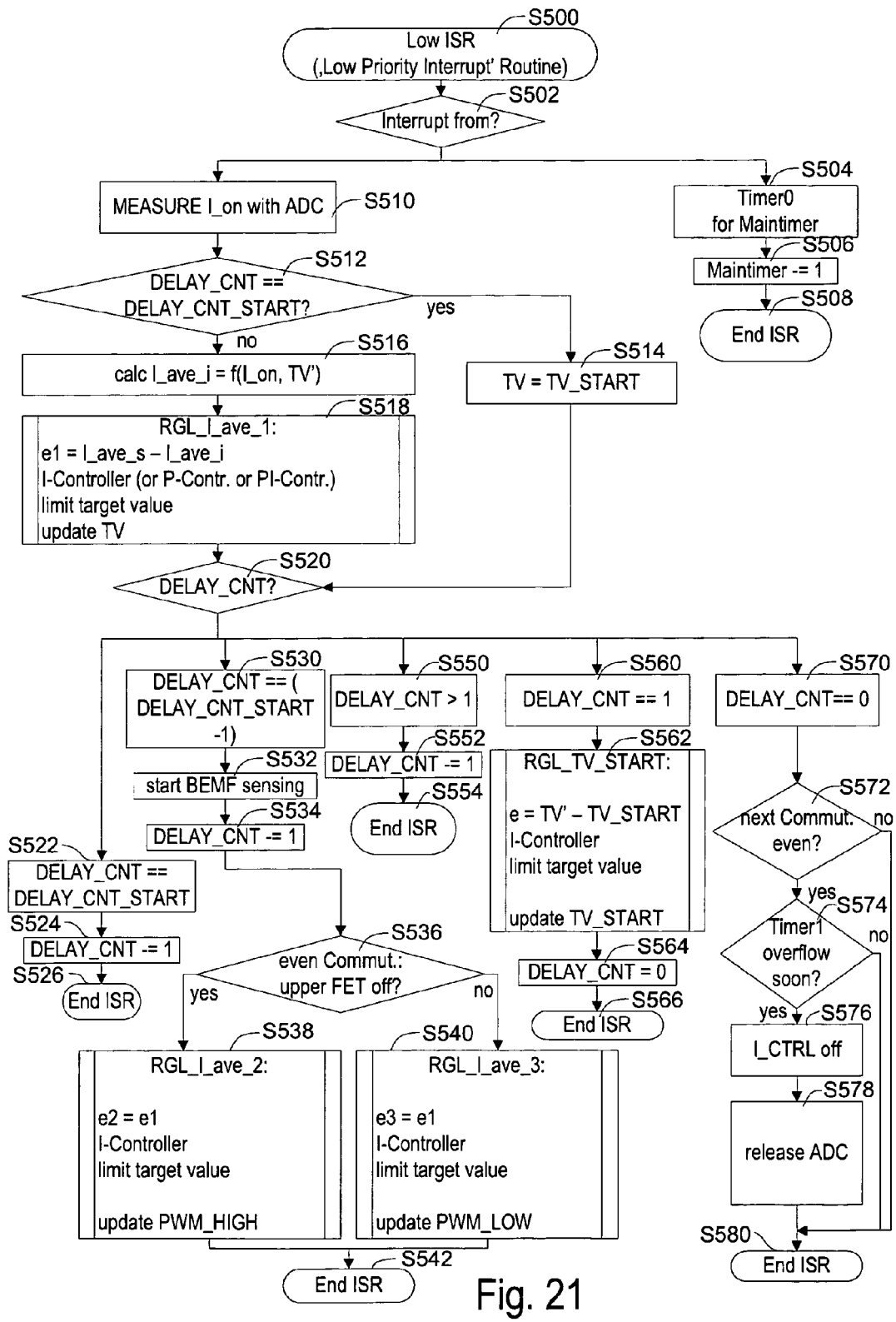
Figure 22:
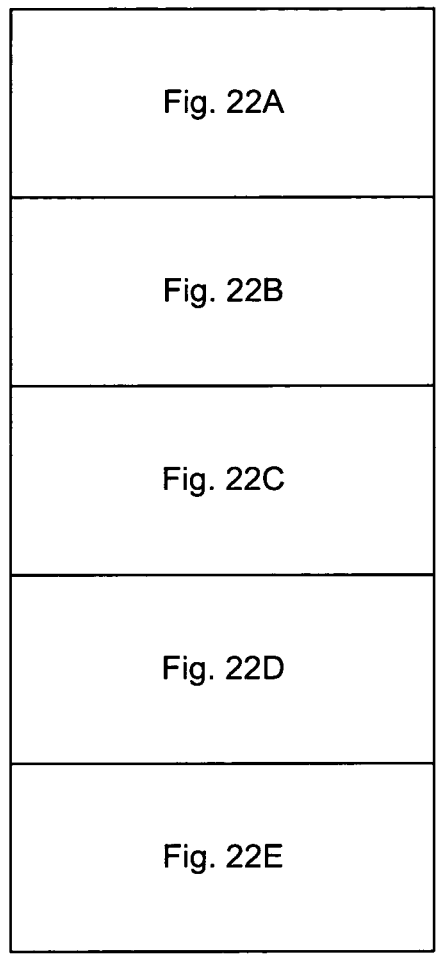
Figure 22A:
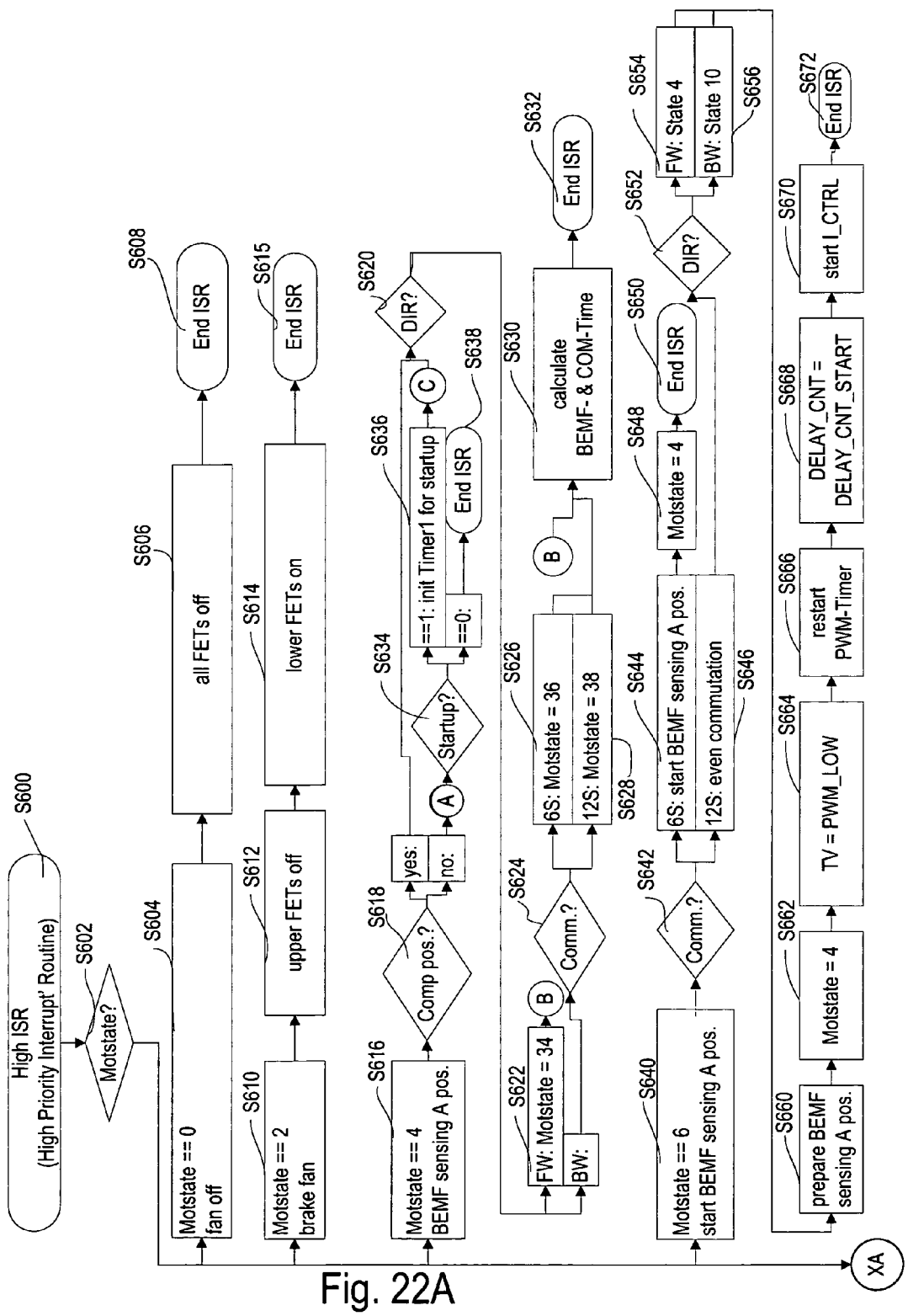
Figure 22B:
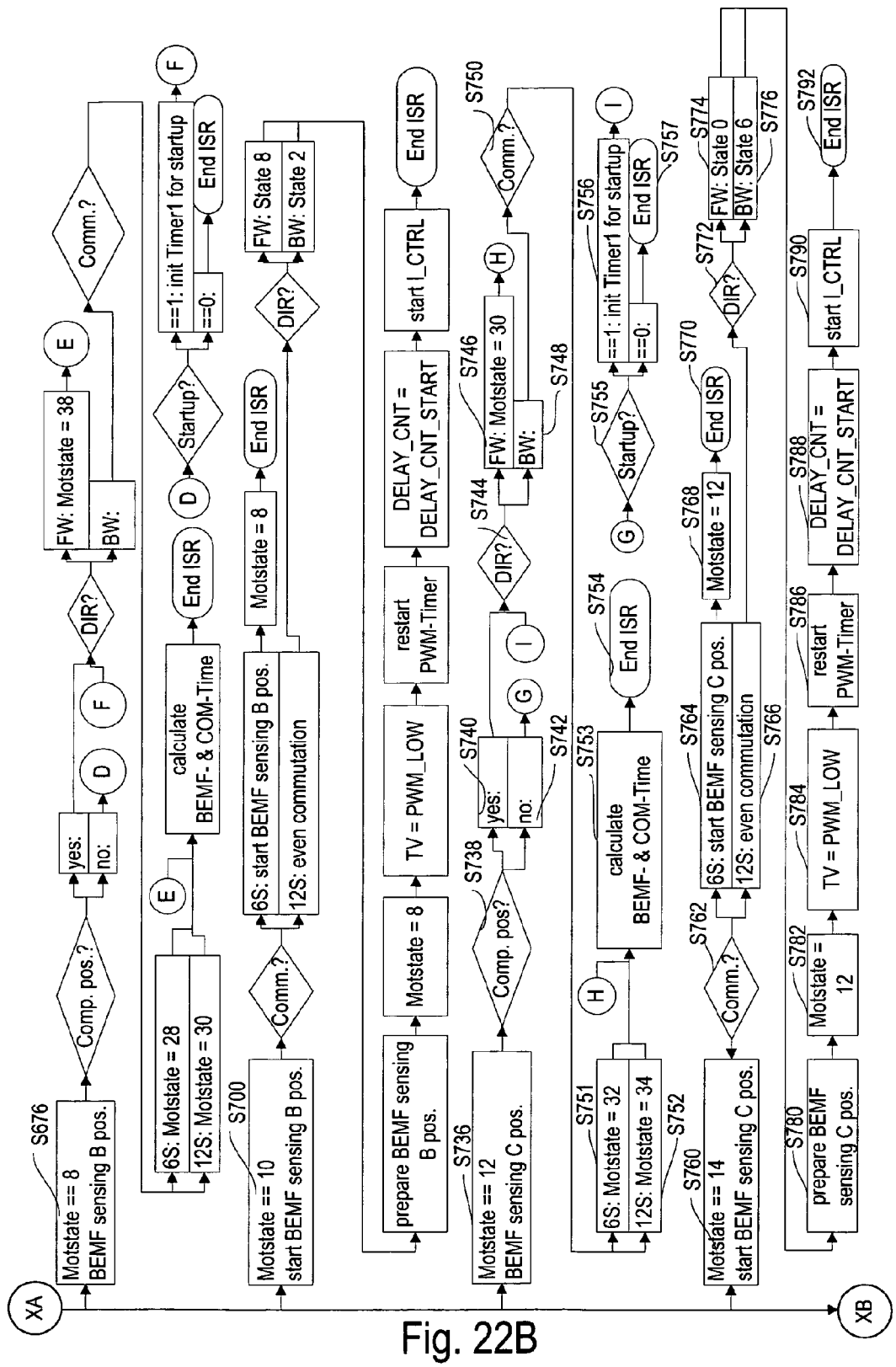
Figure 22C:
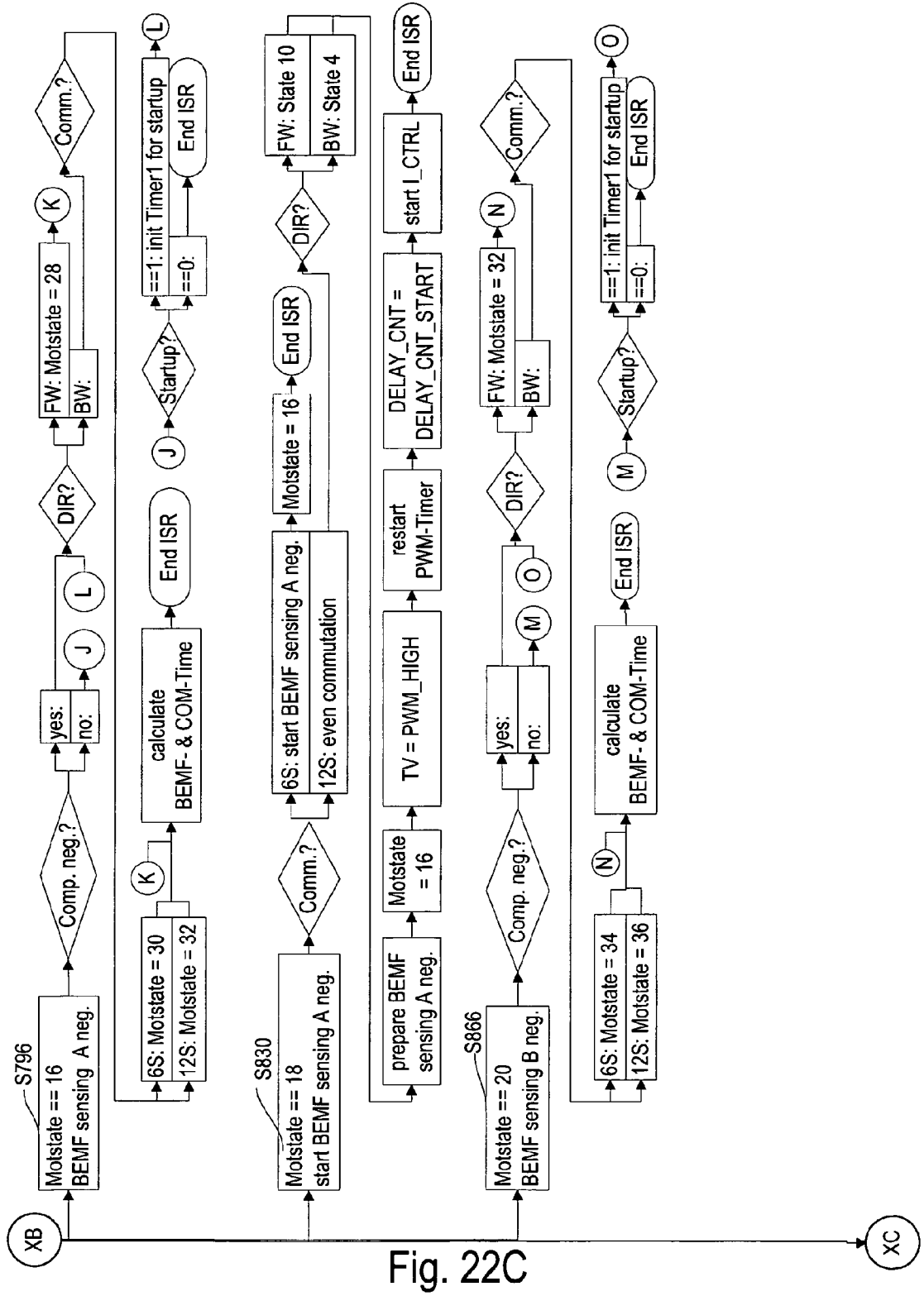
Figure 22D:
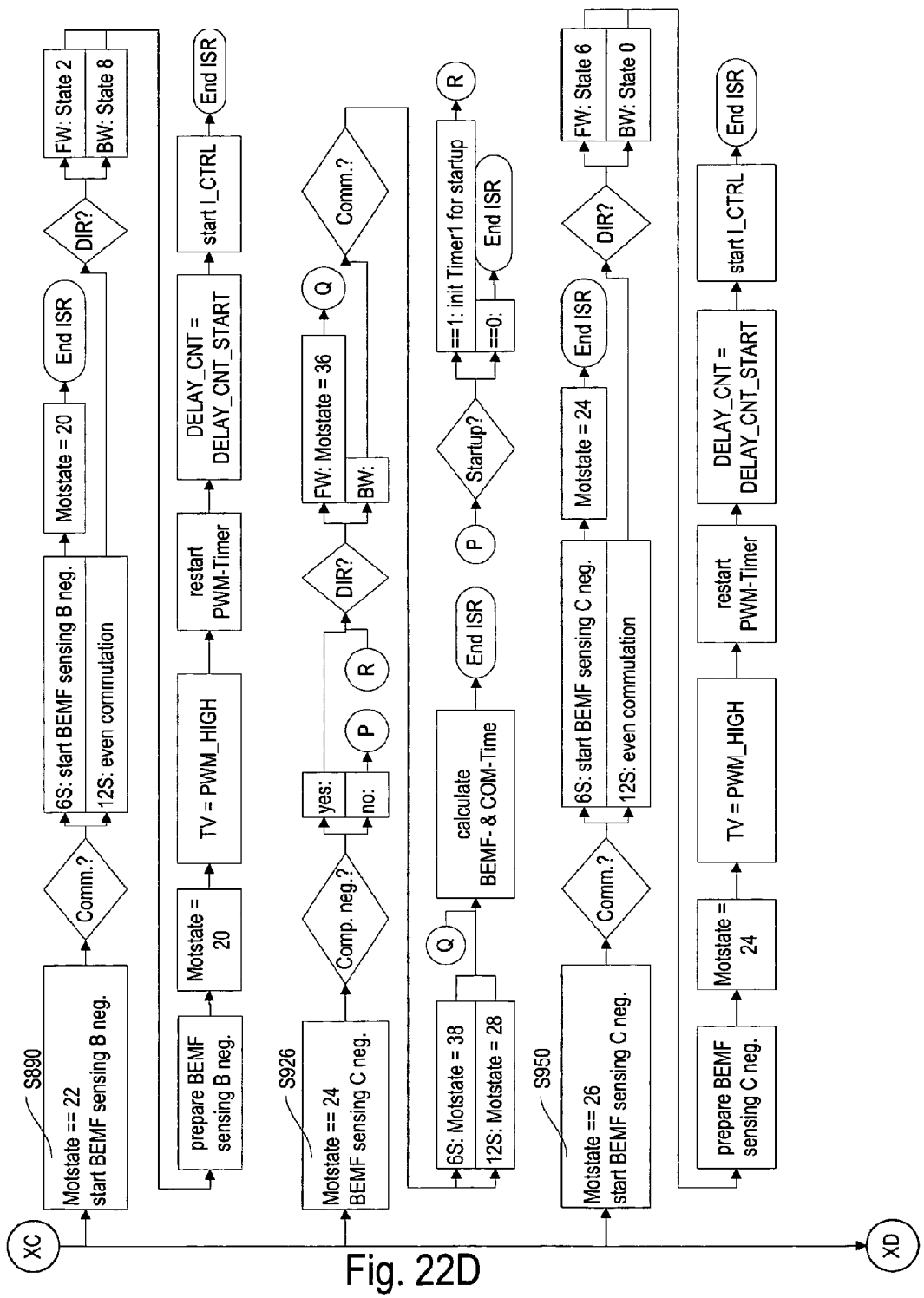
Figure 22E:
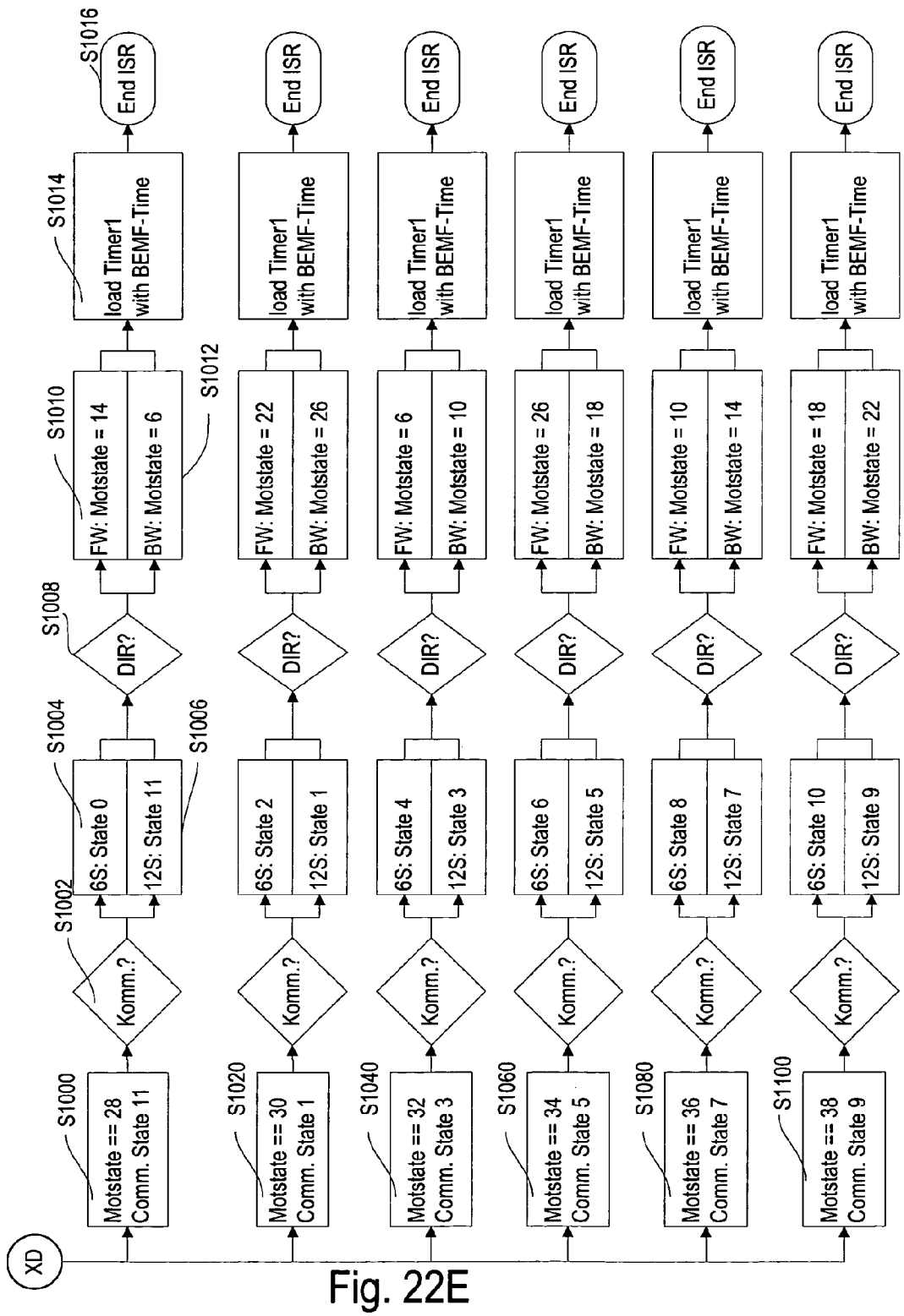
Figure 23:
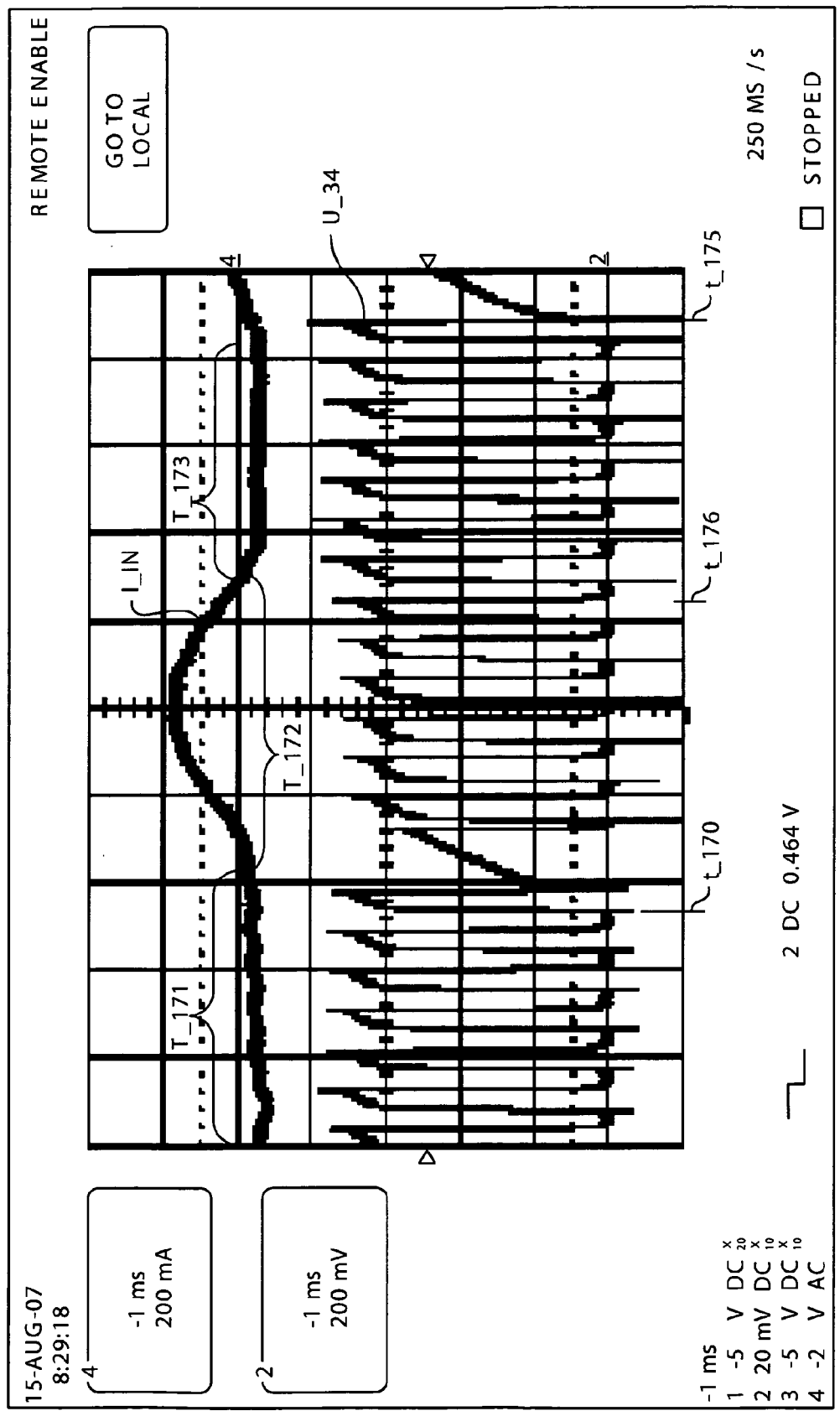
Figure 24:
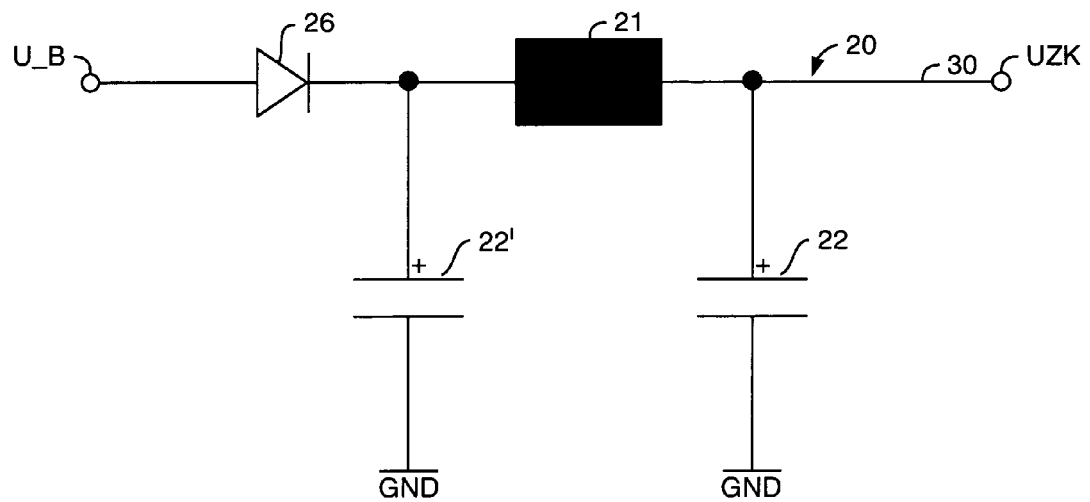

FIG. 16 schematically depicts the routines executing in a microprocessor;

FIG. 17 shows a measurement arrangement for the induced voltage in the context of a sensorless commutation operation;

FIG. 18 depicts generation of a Pulse Width Modulation (PWM) signal having a centrally arranged pulse;

FIG. 19 is a flow chart for overall control of the electronically commutated motor;

FIG. 20 is a flow chart for a main program;

FIG. 21 is a flow chart for a Low_ISR interrupt routine;

FIG. 22 is a flow chart for a High_ISR interrupt routine;

FIG. 23 shows a measurement of the input current and the voltage at a current measurement element;

FIG. 24 shows a pi ($\pi$) filter for reducing the line-conducted emissions; and FIG. 25 is a current flow diagram for a twelve-step commutation with ramped shutdown of the power stage.

DETAILED DESCRIPTION

Figure 1:
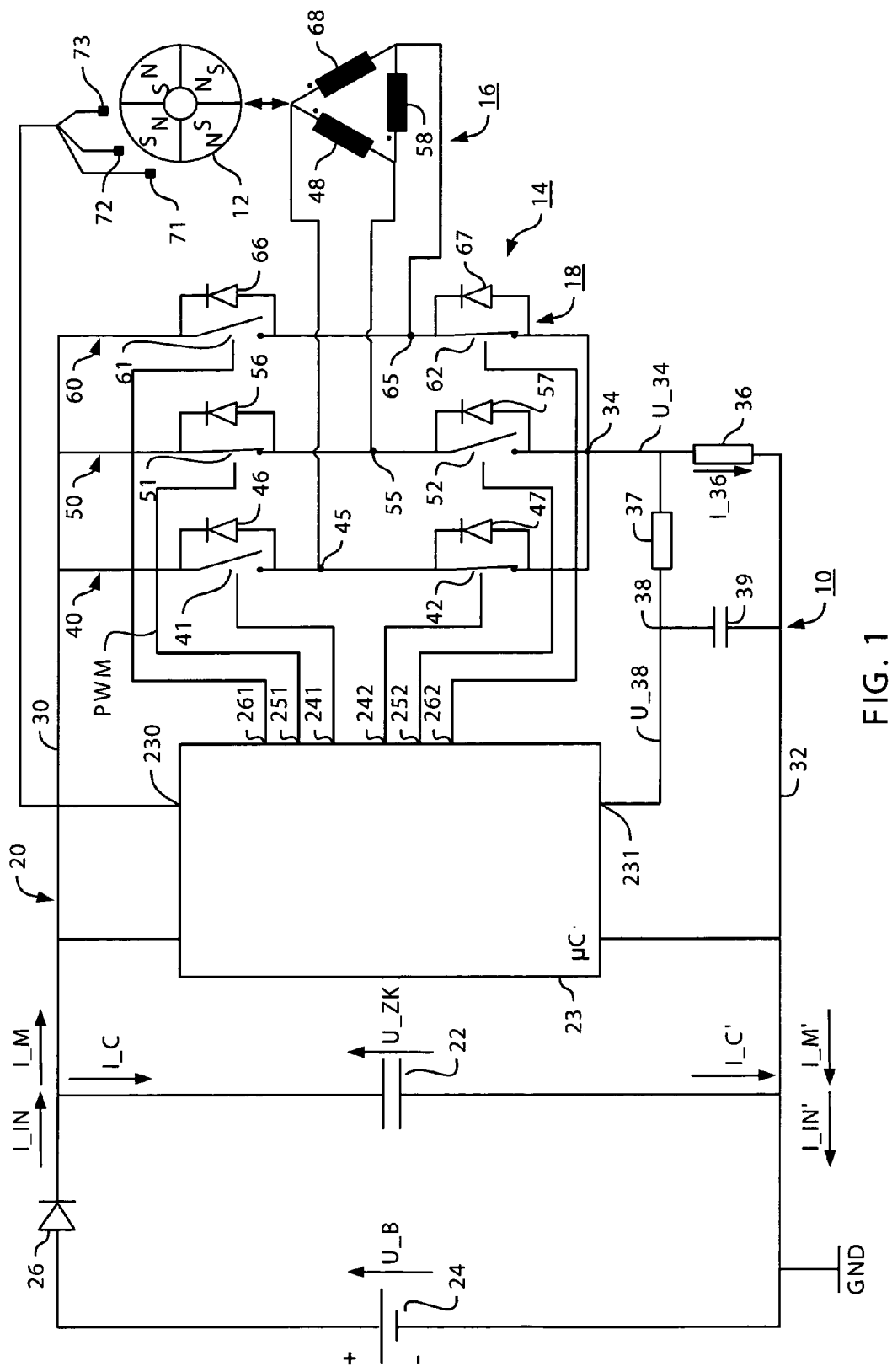

FIG. 1 shows an electric motor 10 having a rotor 12 and a stator 14, which comprises a winding arrangement 16 having three strands 48, 58, 68, and a power stage 18. Power stage 18 is connected, via an upper lead 30 and a lower lead 32 (GND), to a DC link circuit 20 having a link circuit capacitor 22.

A link circuit voltage U_ZK is present at link circuit capacitor 22, and the latter is connected, via an optional polarity protection diode 26, to a DC voltage source 24 having a voltage U_B.

A microprocessor or microcontroller, hereinafter called microcontroller μC 23, is likewise connected to DC link circuit 20, and serves to control motor 10.

Power stage 18 serves for current flow through winding arrangement 16, and has three bridge arms 40, 50, 60 having three upper switches 41, 51, 61 that connect upper lead 30 to three terminal nodes 45, 55, 65 for winding arrangement 16, and having three lower switches 42, 52, 62 that connect the three terminal nodes 45, 55, 65 to a common bottom node 34 that in turn is connected via a current measuring resistor 36 to lower lead 32 (GND). The upper and lower switches are, for example, n-channel MOSFETS, model IRFR3710Z, of the International Rectifier company.

Switches 41, 51, 61, 42, 52, 62 are n-channel MOSFETs (Metal Oxide Semiconductor Field Effect Transistors), and associated with each of them are respective recovery diodes 46, 56, 66, 47, 57, 67 to allow a current flow oppositely to the normal current direction that may occur.

Terminal nodes 45, 55, 65 are connected to winding arrangement 16, which is connected as a delta circuit; other configurations, such as star circuits, are also possible.

Rotor 12, which interacts with winding arrangement 16, is embodied with four poles (other numbers of poles are also possible), and associated with said rotor are three rotational position sensors (e.g. Hall elements) 71, 72, 73 whose output signals are delivered to inputs 230 of μC 23 in order to determine the rotational position of rotor 12. Sensorless commutation, as described in FIG. 16 and FIG. 17, is alternatively also possible.

A resistor 37 is connected to bottom node 34 and to a node 38 that is in turn connected via a capacitor 39 to lower lead 32 and additionally to input 231 of μC 23. RC element 37, 39 is connected as a low-pass filter, and filters out interference.

μC 23 is connected via an output 241 to switch 41, via an output 251 to switch 51, via an output 261 to switch 61, via an output 242 to switch 42, via an output 252 to switch 52, and via an output 262 to switch 62. μC 23 can thus control the commutation of power stage 18.

Commutation

FIG. 2 shows one possibility for commutating power stage 18 using so-called six-step commutation.

The diagram shows the driving of switches 41, 42, 51, 52, 61, 62 over one electrical revolution (360° el.), i.e. over one complete commutation cycle. For a four-pole motor, the electrical period begins again after half a mechanical revolution (180° mech.), since these two rotor positions are magnetically equivalent, and cannot be distinguished. In the angle range from 0° el. to 60° el., lower switch 42 is always closed, and upper switch 51 is driven with a clocked signal PWM having a predetermined duty cycle TV in order to generate a current through strand 48. A clocked signal is a signal that switches back and forth between at least two states such as, for example, HIGH and LOW. Lower switch 52 is driven with the inverse signal /PWM of switch 51, so that when upper switch 51 is switched off, current looping through node 55, strand 48, node 45, switch 42, and switch 52 back to node 55 becomes possible, since otherwise the current would flow through recovery diode 57, which would result in higher losses. The term "active current looping" is used when the corresponding lower switch is driven with the inverse signal /PWM, and "passive current looping" when current looping occurs through the recovery diode.

After 60° el., current delivery through switch 51 is terminated, and the clocked signal having a predetermined duty cycle TV is applied to switch 61. Correspondingly, the inverse clocked signal /PWM of switch 61 is applied to lower switch 62. After 120° el., lower switch 42 is switched off and lower switch 52 is instead switched on, so that current can now flow through switch 61, winding arrangement 16, and lower switch 52. Commutation is continued in accordance with the diagram until the initial state is reached again after 360° el. Because of the six commutation states (0, 2, 4, 6, 8, 10), this type of commutation is referred to as six-step commutation.

FIG. 3 shows an advantageous possibility—so-called twelve-step commutation—for commutating power stage 18. The driving signals for switches 41, 42, 51, 52, 61, and 62 are once again depicted over an angle range of 360° el.

Figure 4:
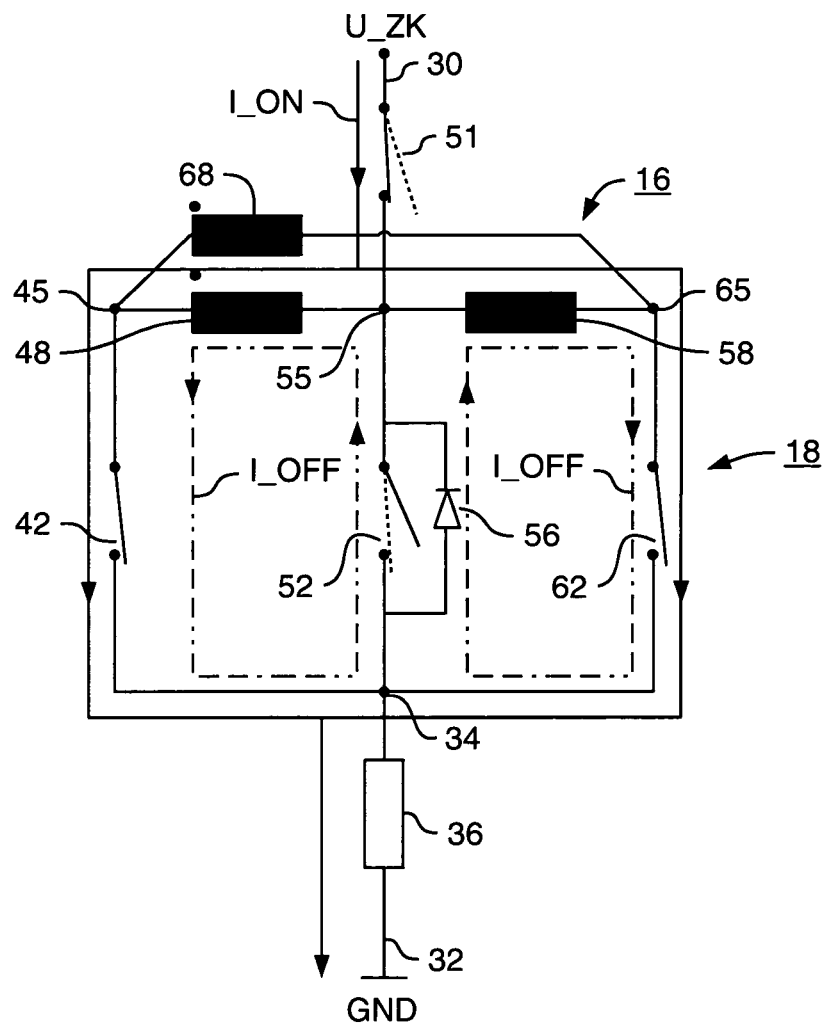
FIG. 4 depicts the current flowing through the winding arrangement and the power stage.

FIG. 4 is a simplified depiction of winding arrangement 16 and of power stage 18, for the range from 0° el. to 30° el. according to FIG. 3.

Between 0° el. and 30° el., both lower switch 42 and lower switch 62 are switched on, and upper switch 51 is being driven with a clocked signal PWM having a predetermined duty cycle TV, and lower switch 52 with the inverse signal /PWM of switch 51. In the state "switch 51 on and switch 52 off," a current I_on flows from upper lead 30 through switch 51 on the one hand through strand 48, switch 42, and measuring resistor 36 to lower lead 32, and on the other hand through strand 58, switch 62, and measuring resistor 36 to lower lead 32; the corresponding current flow I_on and the corresponding switch positions are depicted as solid lines.

When switch 51 is switched off by clocked signal PWM and switch 52 is switched on by the inverse clocked signal /PWM, however, current can no longer flow out of DC link circuit 30, 32 because of the inductance of strands 48, 58, but a current continues to flow through the latter, and two current loops I_off are produced, one proceeding through strand 48, switch 42, and switch 52 back to strand 48, and the other through strand 58, switch 62, and switch 52 back to strand 58. The corresponding current flows I_off and the corresponding switch positions of switches 51 and 52 are depicted with dashed lines. If power stage 18 is driven with passive current looping or if a delay is necessary between the switching off of upper switch 51 and the switching on of lower switch 52, current I_off flows through recovery diode 56.

After 30° el., lower switch is switched off so that only lower switch 42 now remains permanently switched on. This means that the entire current I_on must flow through strand 48 and lower switch 42, through which hitherto only approximately half the current I_on has flowed. Because the current in a strand cannot (because of the latter's inductance) be increased immediately, whenever a change takes place in the current flow through the strands of power stage 16, a current gap occurs that leads to a fluctuation in input current I_in. Because, in the context of the twelve-step commutation operation shown in FIG. 3, half the total current is always already flowing through a different strand upon switchover, the current gap is smaller than in the case of six-step commutation, in which prior to commutation the current is always flowing entirely through a first strand and after commutation entirely through a second strand, so that the current through the first strand must be reduced from the full current level to zero.

After 60° el., in addition to upper switch 51, upper switch 61 is driven with the clocked signal PWM, and both lower switch 52 and lower switch 62 are driven with the inverse clocked signal /PWM.

After 90° el., upper switch 51 is then completely switched off, so that only upper switch 61 is now being driven with the clocked signal PWM. Commutation is then continued in accordance with the diagram. Unlike in FIG. 2, an overlapping region is therefore respectively provided during commutation for both for the lower switches and for the upper switches, or a second upper or lower switch is switched on before a first upper or lower switch, respectively, is switched off. Because a total of twelve commutation steps are performed, and there are twelve states 0 through 11, this is referred to as twelve-step commutation. Those states that are identical in the case of six-step commutation according to FIG. 2 and twelve-step commutation according to FIG. 3 have been labeled with the same even state numbers 0, 2, 4, 6, 8, 10. Those states that occur only in twelve-step commutation according to FIG. 3 have been labeled with the odd state numbers 1, 3, 5, 7, 9, and 11.

It is difficult (or, with some types of motor, impossible) to start up motor 10 using twelve-step commutation, and it is therefore preferred to start using six-step commutation, and change over to twelve-step commutation after startup and once a predetermined minimum rotation speed has been reached.

Twelve-step commutation, or commutation with overlapping switching on and off of the transistors, is not possible with a one-strand motor, and the latter therefore always has, as a matter of principle, large current gaps during commutation as compared with a three-strand motor.

Figure 5:
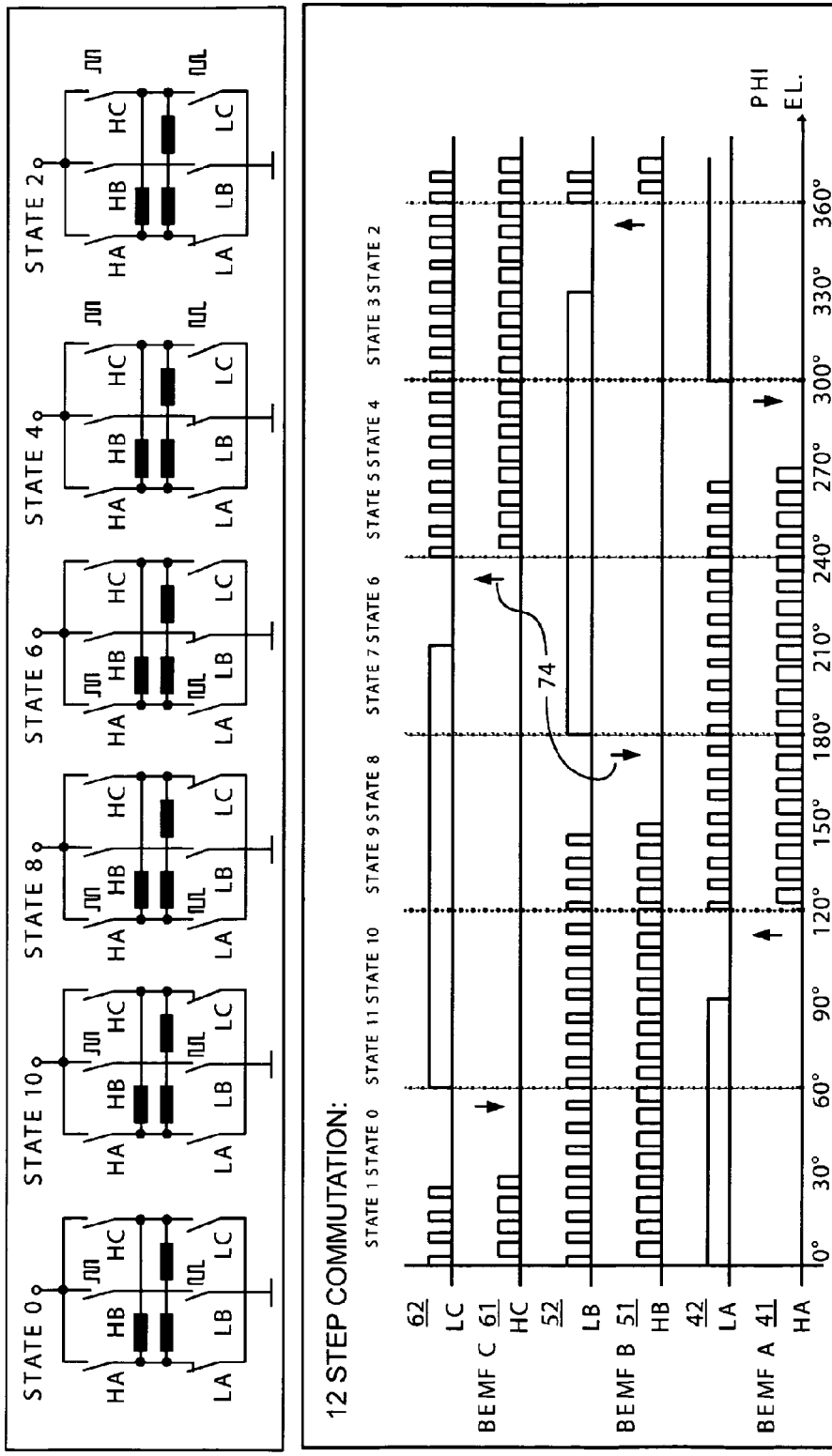
FIG. 5 is a current flow diagram for a twelve-step commutation in the reverse direction.

FIG. 5 likewise shows a diagram for a twelve-step commutation operation, but for the opposite rotation direction. A schematic circuit diagram of power stage 16, with switch positions, is shown at the top for the even-numbered states 0, 2, 4, 6, 8, 10. The strands of the power stage are labeled A, B, C, and the upper switches are labeled H (HIGH) and the lower switches L (LOW). Thus HA=41, HB=51, HC=61, LA=42, LB=52, LC=62. These designations will be used hereinafter with the same meanings.

Current Measurement

Figure 6:
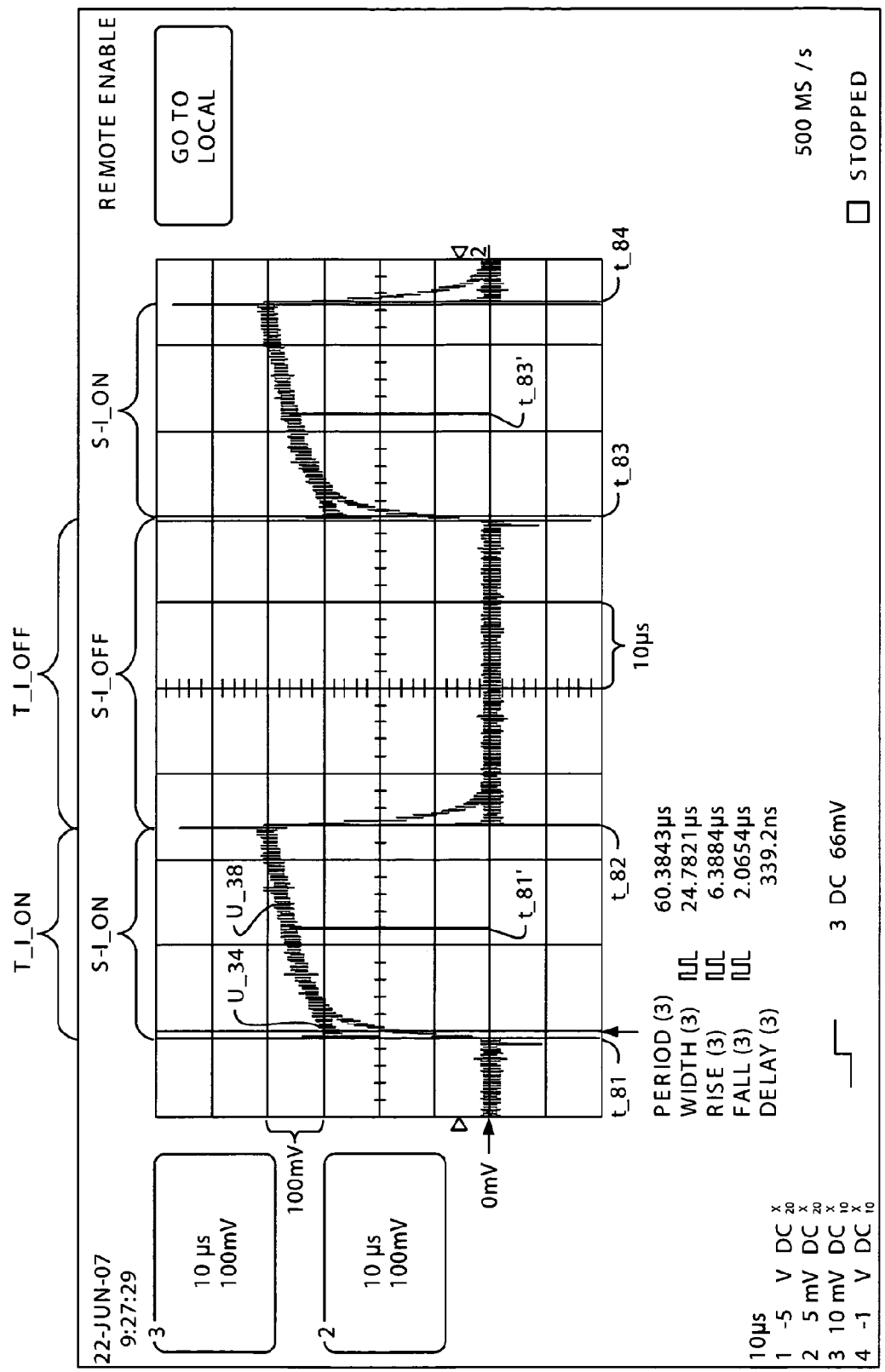
FIG. 6 is a measurement diagram for the current at a current measurement element.

FIG. 6 shows a measurement diagram of voltage U_34 at bottom node 34 and voltage U_38 at node 38 (FIG. 1), measured in the context of a current flow in accordance with FIG. 3 in the range from 0° el. to 30° el. As with the other measurement diagrams, the scale is indicated at the edge.

During time period T_I_on between times t_81 and t_82, upper switch 51 is switched on and lower switches 42 and 62 are likewise switched on ("S-I_on" state), as they are in the entire rotation angle range between 0° el. and 30° el. A current I_on as shown in FIG. 4 flows from upper lead 30 through upper switch 51, winding arrangement 16, and lower switches 42 and 62 to bottom node 34, and from there through current measuring resistor 36 to lower lead 32. Current I_on produces a corresponding voltage U_34 at measuring resistor 36, which voltage can be evaluated in the form of voltages U_34 and U_38, respectively.

At time t_82, upper switch 51 is switched off and lower switch 52 is switched on ("S-I_off" state), and what results therefrom during the time period T_I_off is current looping within power stage 18 with the currents I_off according to FIG. 4, which looping current continues to drive the motor. A current I_M no longer flows, however, between upper lead 30, power stage 18, measuring resistor 36, and lower lead 31, and voltages U_34 and thus also U_38 correspondingly drop to 0 V.

At time t_83, upper switch 51 is switched on again and voltages U_34 and U_38 rise again because of the rising current I_on.

At time t_81 it is evident that voltage U_34 has peaks, which result in particular from the switching operation. RC element 37, 39 of FIG. 1 filters out these interference peaks, and the resulting signal U_38 can be evaluated more easily than signal U_34 at bottom node 34. The two signals U_34 and U_38 map the present current I_M through leads 30 and 32, respectively, and they rise as current I_M rises, and fall as current I_M falls.

The current through an inductance L having a resistance R rises over time t, for a predetermined voltage U, in accordance with $$I = U/R(1 - e^{-Rt/L}) \quad (1)$$

and thus approaches the value U/R. After the voltage source is switched off in a circuit having a resistance R, it drops back down again, starting from a current $I_0$, in accordance with $$I = I_0 e^{-tR/L} \quad (2).$$

As is evident in the case of signal U_34, the current through winding arrangement 16 rises during the S-I_on state starting at time t_81; and during the S-I_off state, starting at time t_82, in which the current through winding arrangement 16 is not mapped at measuring resistor 36, the current then drops back slightly so that it is lower at time t_83 than at time t_82.

Current Measurement—Approximation

Figure 7:
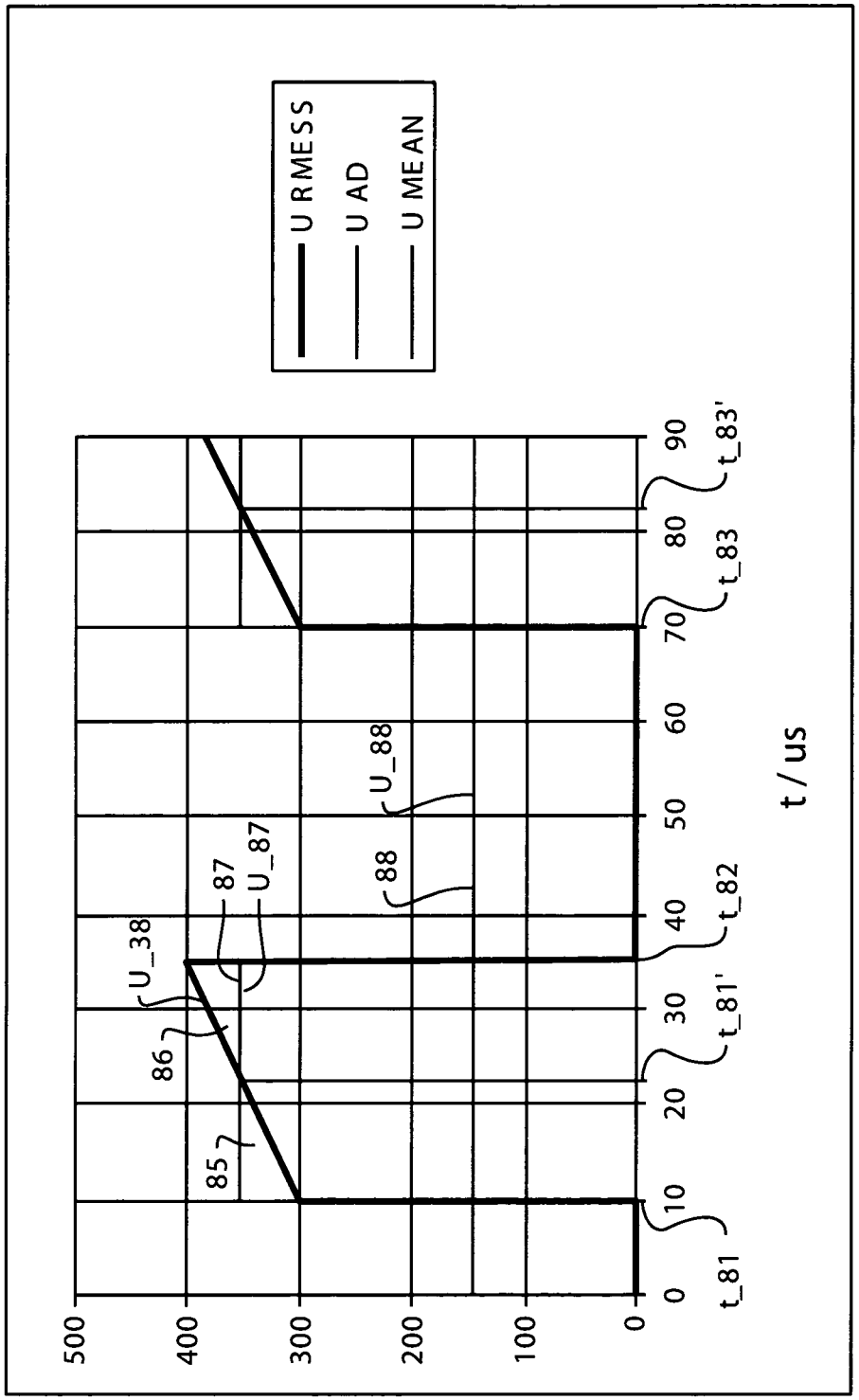
FIG. 7 is an idealized depiction of the current from FIG. 6.

FIG. 7 is a schematic depiction of voltage U_38 in idealized form. Voltage U_34 or U_38 rises, because of the inductance of winding arrangement 16, in accordance with equation (1); if switch-on times T_I_on are sufficiently short, the rise between t_81 and t_82, and t_83 and t_84, can be regarded approximately as linear.

Average value 87 of voltages U_34 and U_38, respectively, between times t_81 and t_82 can be ascertained approximately by measuring the voltage U_34 and U_38, respectively, at a time t_81' that is located centeredly between times t_81 and t_82. With an approximately linear profile for voltages U_34 and U_38, this measurement yields average value 87 of voltage U_38 between times t_81 and t_82. This can be derived graphically, since the area of triangle 85 corresponds to the area of triangle 86.

The following general equations apply:

$$I\_36 = U\_34/R\_36 \quad (3)$$

and $$I\_36 = U\_38/R\_36 \quad (4)$$

given the ohmic resistance R_36 of resistor 36, which is equal to, for example, 0.15 ohm. Because of the proportionality between current I_36 or I_M and voltage U_34 or U_38, an average value of voltage U_34 or U_38 also correspondingly characterizes the average value of current I_36 or I_M, and a method is described below for ascertaining average value 88 of voltages U_34 and U_38.

The averaged voltage U_87 between times t_81 and t_82 is equivalent to $$U\_87 = U\_38(t\_81)' \quad (5),$$

where U_38 (t_81') is voltage U_38 at time t_81', and voltage U_87, for example in FIG. 6, is U_87=370 mV.

The corresponding current I_on_ave is equal to $$I\_\text{on\_ave} = U\_87/R\_36 = 370 \text{ mV}/0.15 \text{ ohm} = 2.47 \text{ A} \quad (6).$$

The average current I_on_ave ascertained in this fashion also flows, approximately, during current looping in power stage 16, and it could therefore be used, for example, to determine the torque proportional to the current through winding arrangement 16, and also to determine the dissipated power generated in the power stage.

The current value I_on_ave does not, however, correspond to the total current consumed during one period (e.g. t_81 to t_83) of the clocked signal from DC link circuit 20, since no current is consumed from DC link circuit 20 between times t_82 and t_83.

The average voltage U_88 over the entire period t_81 to t_83 of voltage U_38 is obtained by multiplying the value I_on_ave by duty cycle TV of clocked signal U_38 or PWM, yielding $$U\_88 = U\_87 * TV = U\_38(t\_81') * TV \quad (7),$$

and the average current I_ave flowing through the DC link circuit is obtained as $$I\_\text{ave} = U\_87 * TV/R\_36 = I\_\text{ave\_on} * TV \quad (8).$$

The duty cycle TV of a clocked signal is, in general, $$TV = T\_\text{on}/(T\_\text{on} + T\_\text{off}) \quad (9),$$

where T_on is the duration of the I_on pulse during one period of the clocked signal.

The duty cycle TV of a PWM signal having a period length T_PWM=T_on+T_off and a variable pulse duration T_on_PWM is $$TV = T\_\text{on\_PWM}/T\_\text{PWM} \quad (10).$$

PWM signals having a constant or a variable period length T_PWM can be used. A constant period length T_PWM is used for the PWM signals in FIGS. 2 to 5 and FIG. 25.

The average current value I_ave for current I_M flowing through DC link circuit 20, and thus also voltage U_88, can therefore be completely different, for the same average current value I_on_ave or average voltage value U_87 between times t_81 and t_82, and thus for the same torque of motor 10, as a function of duty cycle TV.

An average value determination using an analog RC low-pass filter was carried out as an experiment. In order to smooth the clocked voltage signal U_34 using the RC low-pass filter, the time constant tau=R*C must be very high. The consequence of this, however, is that effective control of input current I_M, I_IN is no longer possible. This can be explained by the fact that because of the high time constant of the RC low-pass filter, the past history of voltage signal U_34 plays too great a role in terms of control engineering.

In contrast to the solution in which an average value is calculated with an RC low-pass filter, here the average value U_88 of voltage U_38 is ascertained for each PWM period, or in general for a predetermined time span or period of the clocked signal, and it is in fact defined before the following PWM period begins and can therefore be used for good and fast control. It is also possible to ascertain a value characterizing the average value of the input current over multiple periods, e.g. over two, three, or four PWM periods, and a different weighting can, for example, be performed in each case, such that the average value of the PWM period presently being measured accounts for 70%, and the average value of the preceding PWM period for 30%. Alternatively, this can also be taken into consideration in the controller.

The value U_88 characterizing the average value of input current I_IN, I_M could also be ascertained by frequent A/D conversion of signal U_38 at short time intervals (with a high sampling frequency), in combination with a subsequent averaging of the measured values. This requires an extremely fast A/D converter, however, and such devices are usually expensive.

Figure 8:
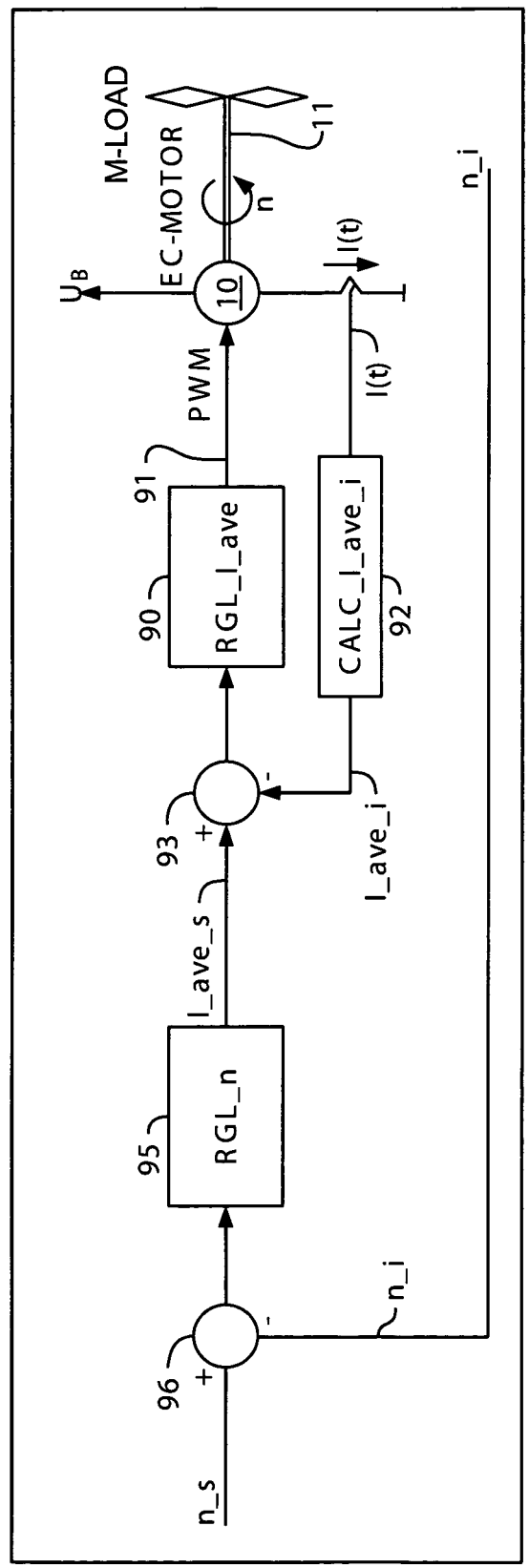
FIG. 8 is a controller diagram for a cascade controller.

FIG. 8 is a controller diagram showing an average current value controller RGL_I_ave 90 that, via a lead 91, outputs a clocked PWM signal to motor 10 or to its power stage as a control input. Motor 10 drives, for example, a load 11 in the form of a fan wheel. As a function of the clocked signal transferred via lead 91, motor 10 consumes a current I(t) from a voltage source U_B, and said current is measured and delivered to an average current value ascertaining apparatus CALC_I_ave_i 92 which ascertains, in particular calculates, from current I(t) an average current value I_ave_i that corresponds to the average current flowing from voltage source U_B to motor 10. A system deviation calculator 93 is connected to average current value controller 90, and average current value I_ave_i is delivered to it as an actual value, and an average current value I_ave_s as a target value. A rotation speed controller RGL_n 95 is superimposed on average current value controller 90, the control input of rotation speed controller 95 being delivered to system deviation calculator 93 as target value I_ave_s. This is referred to as a "cascade controller." Also associated with rotation speed controller 95 is a system deviation calculator 96 to which are delivered on the one hand a target rotation speed value n_s and on the other hand an actual rotation speed value n_i, the latter being ascertained, for example, by a rotation speed ascertaining apparatus on motor 10.

One special aspect of average current value controller 90 is that regulation to the average value of the current flowing into power stage 18 is carried out. This average value can differ, as a function of the clocked signal, from the current flowing in power stage 18.

A further special aspect of average current value controller 90 is the fact that power stage 18 of motor 10, or switches 41, 51, 61, 42, 52, 62 of said stage, are used as setting element 18 for controller 90 in order to influence the value I_ave_i and to equalize the value I_ave_i with the value I_ave_s. The motor can thus be operated without an additional setting element in the input lead to the power stage of motor 10.

Figure 9:
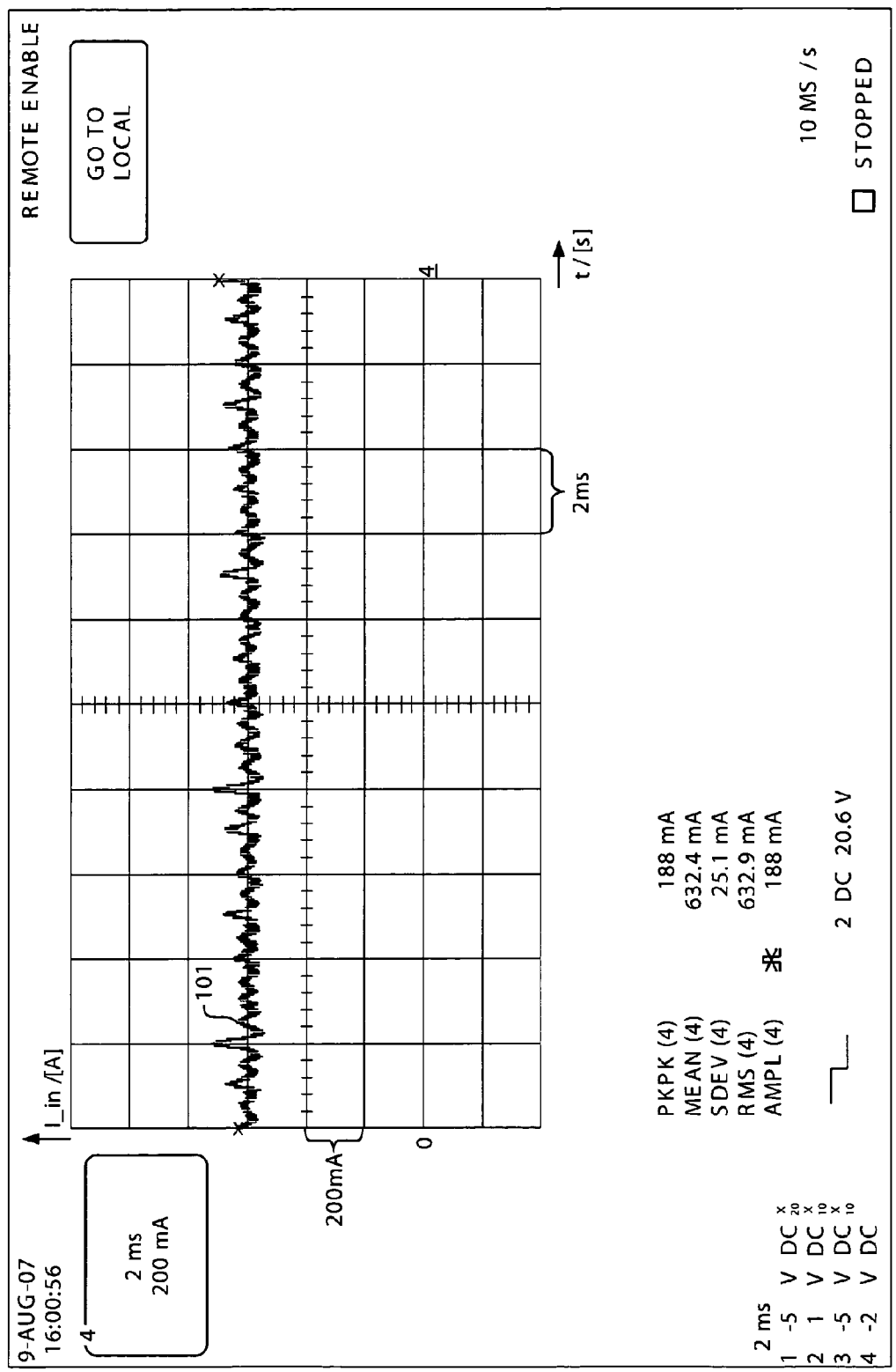
FIG. 9 is a measurement diagram of the input current of a fan with input current average value control.
Figure 10:
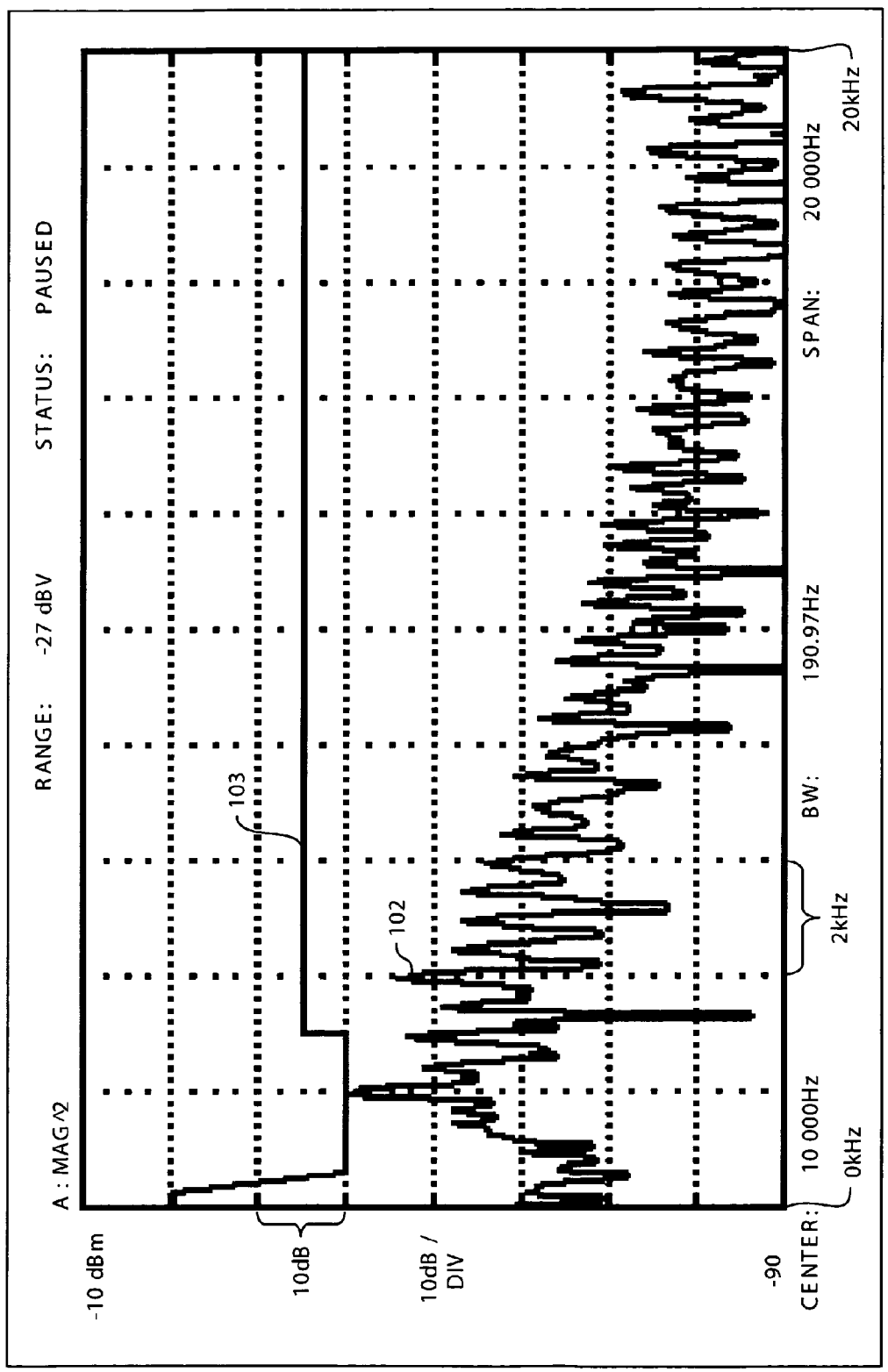
FIG. 10 is a measurement diagram of the line-conducted emissions for the fan of FIG. 9.

FIG. 9 is a measurement diagram in which input current I_in 101 (see FIG. 1) is plotted over time t. FIG. 10 shows level 102 of the corresponding line-conducted emissions in dB, as well as limit value 103 in accordance with ETSI standard EN 300 132-2, hereinafter called the ETSI limit value and ETSI standard, plotted in each case (and for the subsequent measurement diagrams of line-conducted emissions as well) over a frequency range from 25 Hz to 20 kHz. The motor according to FIG. 9 and FIG. 10 operates with average current value control at U_B=48 V, a power consumption P=30 W, a rotation speed n=5000 min$^{-1}$, and free blowing. Because the line-conducted emissions are mainly determined by changes in the input current, average current value control results in low line-conducted emissions 102, so that the latter are below the ETSI limit value 103 when the fan is operated with a power level P=30 W, and thus meets the ETSI standard. Input current I_in 101 has, in this context, an alternating component well below 200 mA.

Figure 11:
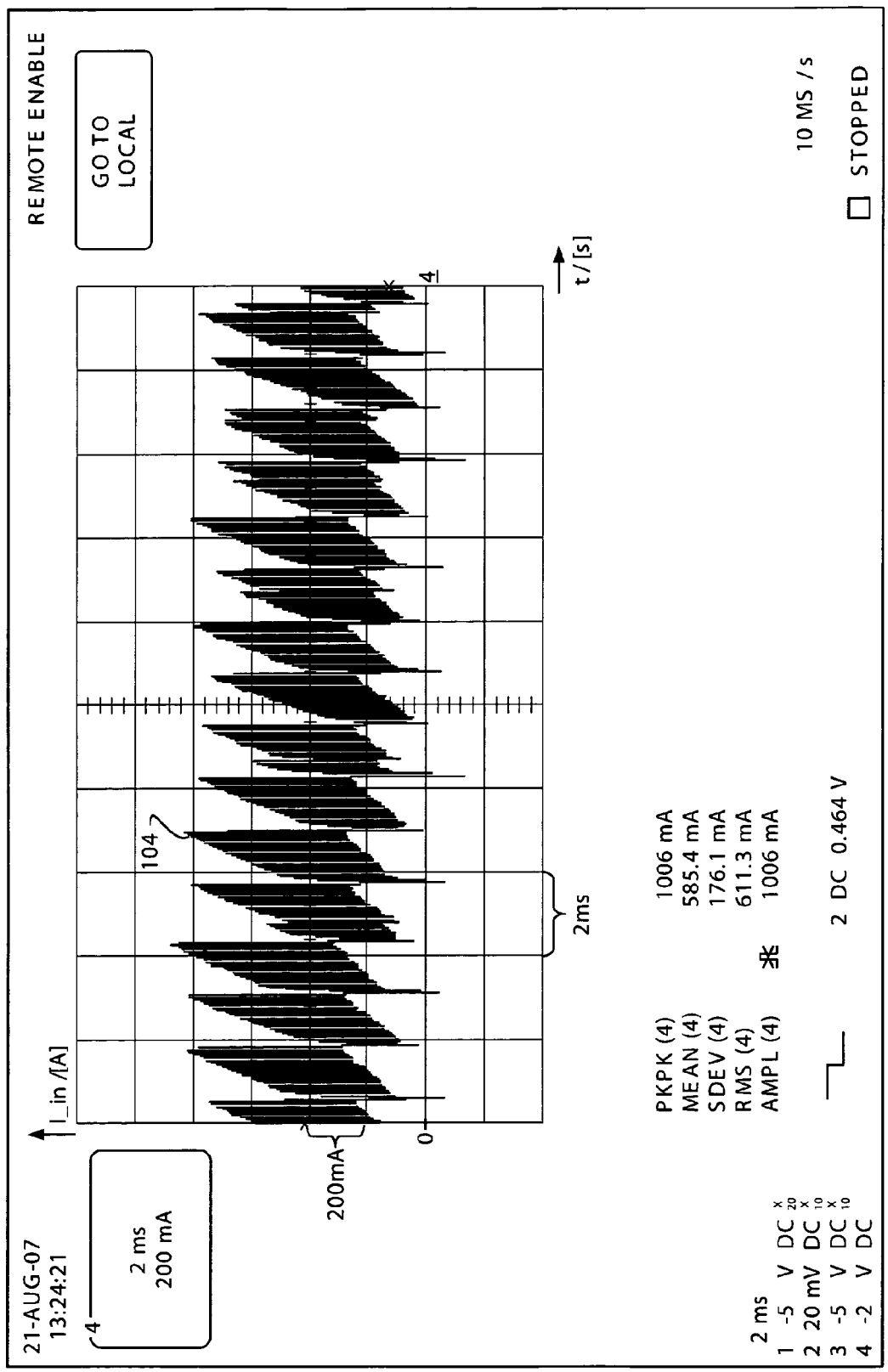
FIG. 11 is a measurement diagram of the input current of a fan without input current average value control.

FIG. 11 is a measurement diagram with input current I_IN 104 over time t, for a fan without average current value control that was operated with the following parameters: U_B=48 V, P=30 W, n=4000 min$^{-1}$, free blowing. The same fan as in FIG. 9 and FIG. 10 was used for this measurement, but the control input of the rotation speed controller was converted directly into a PWM duty cycle. It is clearly evident that, for the same power level, this fan has a considerably higher alternating component (approximately 1 A) in input current I_in 104. This also results in considerably higher line-conducted emissions.

Figure 12:
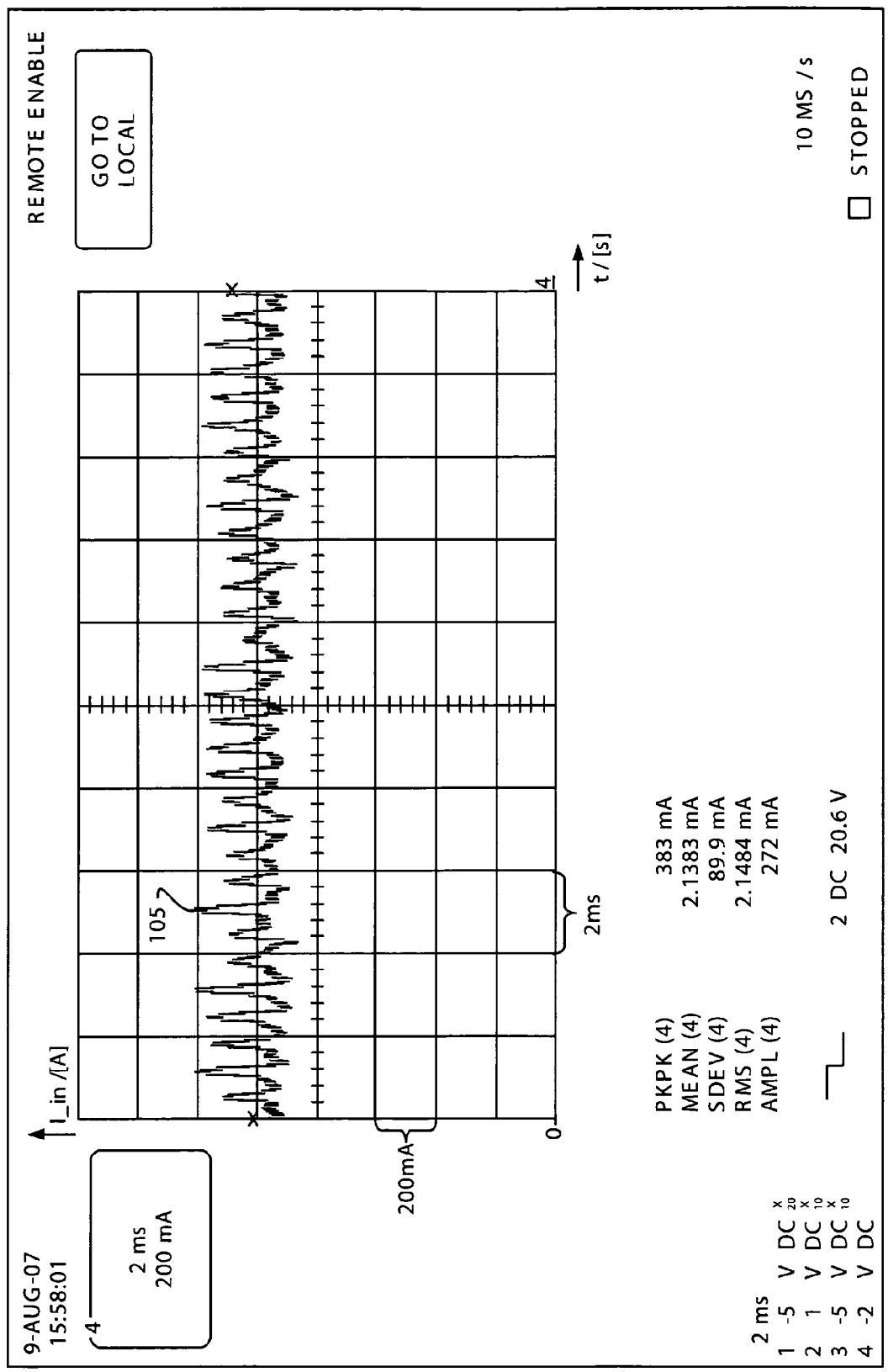
FIG. 12 is a measurement diagram of the input current of a fan with input current average value control, at higher power.
Figure 13:
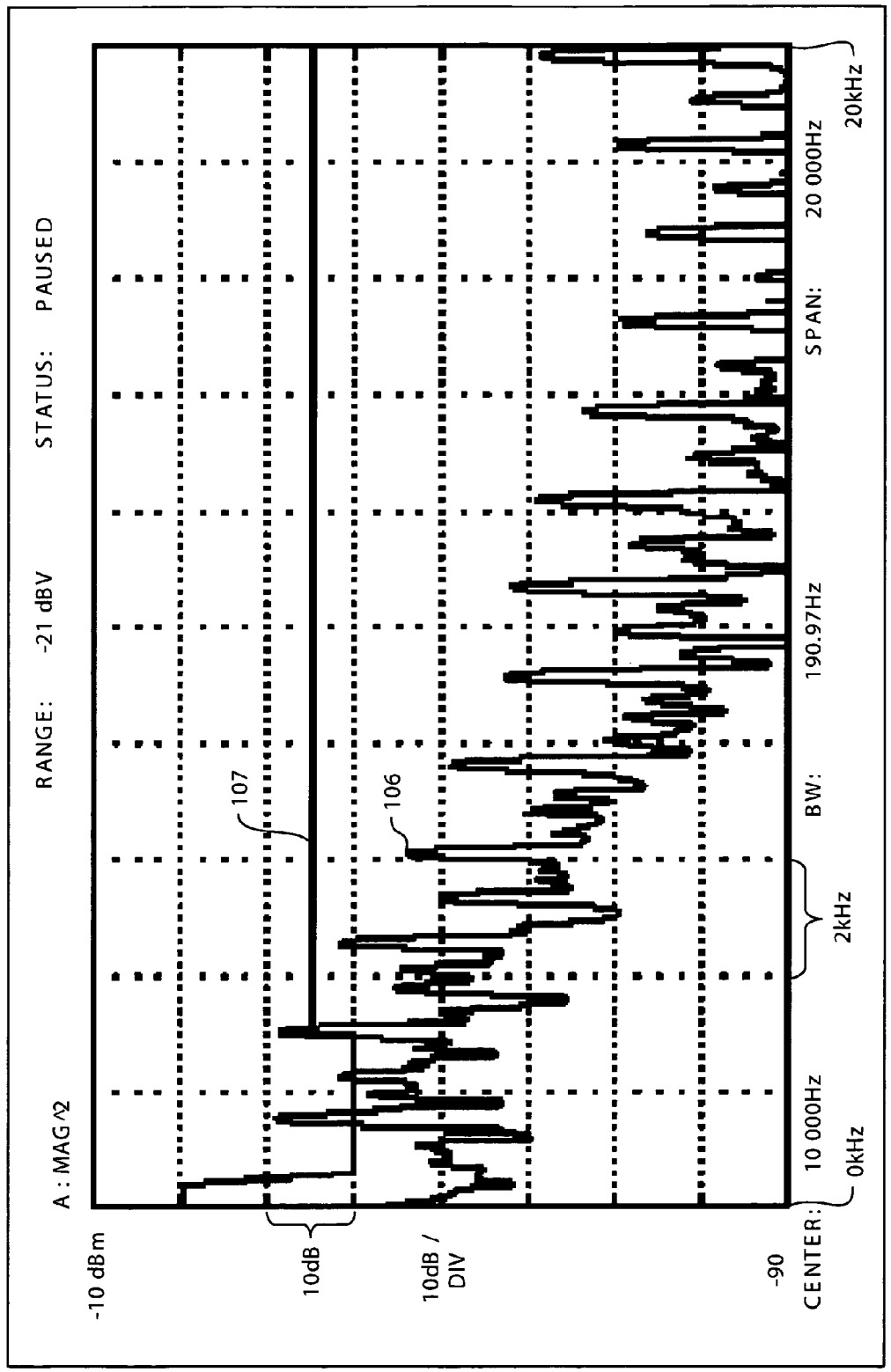
FIG. 13 is a measurement diagram of the line-conducted emissions for the fan of FIG. 12.

FIG. 12 is a measurement diagram in which input current I_in 105 is plotted against time t, and FIG. 13 shows the corresponding line-conducted emissions 106 and the ETSI limit value 107 in dB, plotted over a frequency range from 25 Hz to 20 kHz. The fan is once again one with average current value control, and it was operated with the following parameters: U_B=48 V, P=100 W, n=7700 min$^1$, twelve-step commutation. With a power level of 100 W the ripple in input current I_in 105 is higher (as expected), but line-conducted emissions 106 are for the most part below standard curve 107. Further steps may therefore be necessary in order to meet the ETSI standard.

Figure 14:
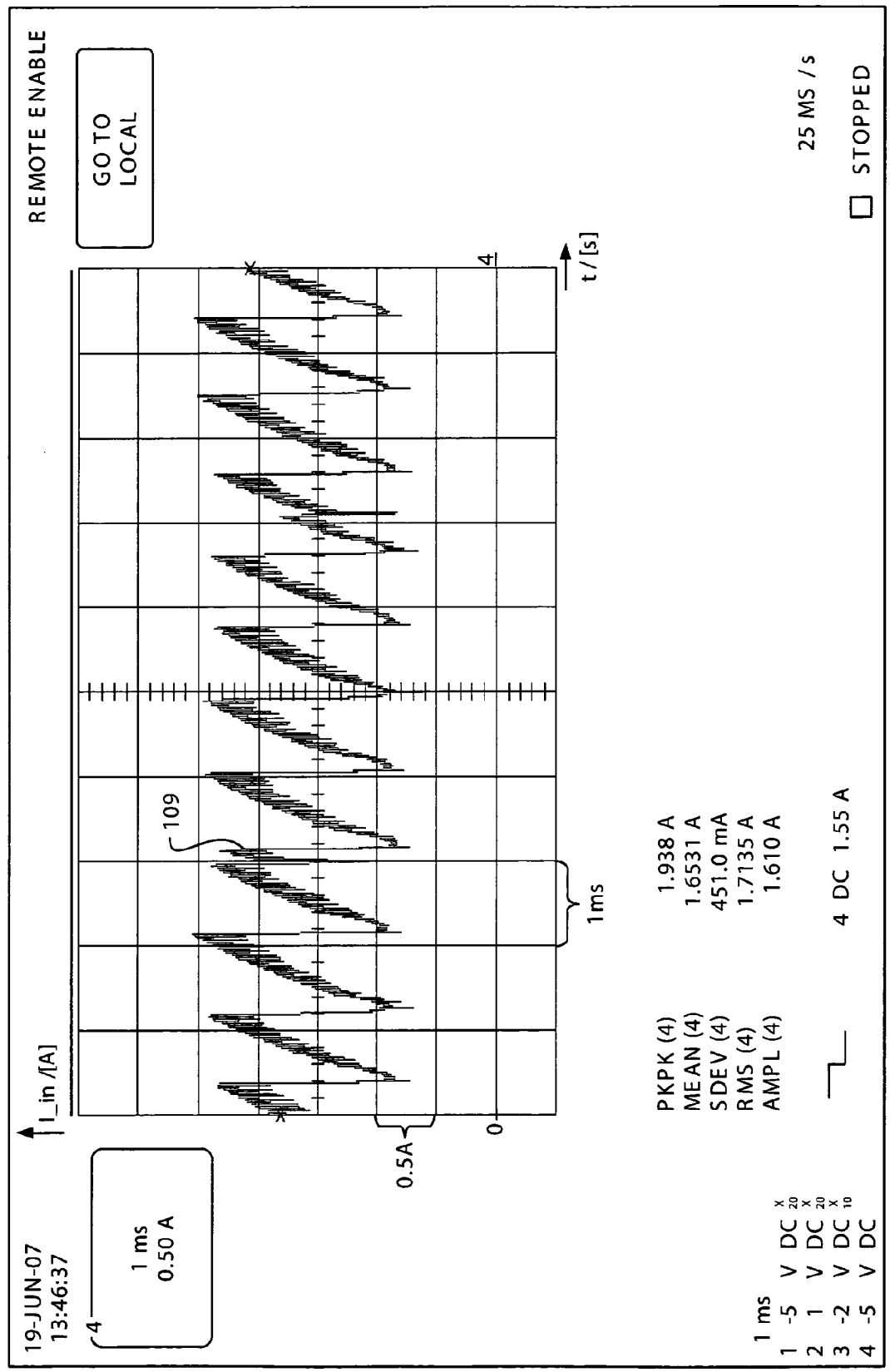
FIG. 14 is a measurement diagram of the input current of a fan without input current average value control, at higher power.
Figure 15:
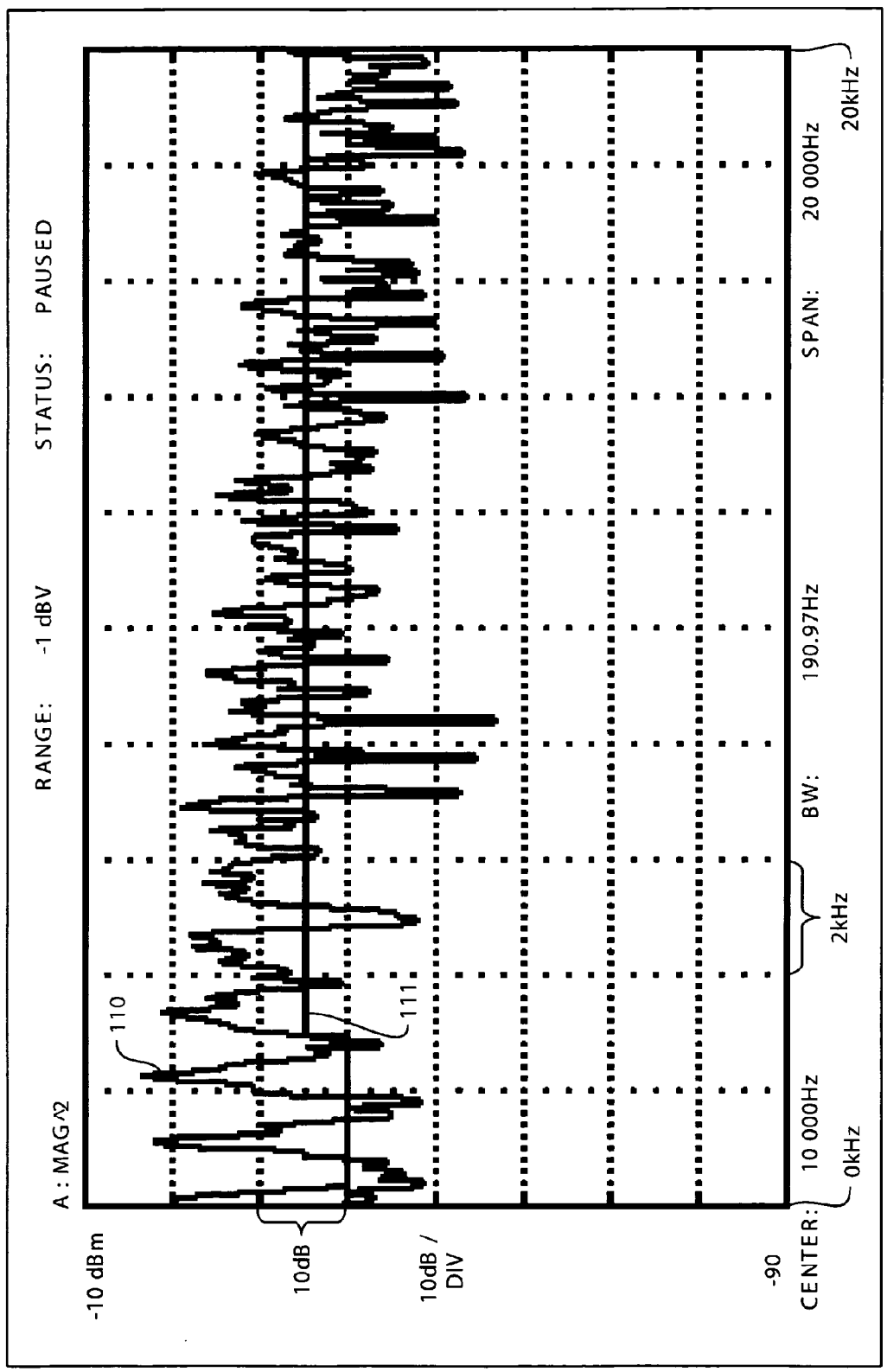
FIG. 15 is a measurement diagram of the line-conducted emissions for the fan of FIG. 14.

FIG. 14 is a measurement diagram in which input current I_in 109 is plotted against time t, and FIG. 15 shows the corresponding line-conducted emissions 110 and ETSI limit value 111 in dB, plotted over a frequency range from 25 Hz to 20 kHz. For this measurement, the fan was operated without average current value control and with the following parameters: U_B=48 V, P=83 W, n=5550 min$^{-1}$, free blowing. The average value of input current 109 in this measurement is approx. 1.7 A, and the peak-to-peak value is 1.8 A. Input current 109 thus has very large fluctuations, and this results in a high level of line-conducted emissions 110 which much exceeds ETSI limit value 111 and therefore does not satisfy the ETSI standard. The fan exceeds ETSI limit value 111 by up to 24 dB.

It is evident from the measurement diagrams presented that a considerable reduction in line-conducted emissions can be achieved by average current value control.

FIG. 16 shows a schematic configuration of the program executing in μC 23 using a cascade controller 95, 90 according to FIG. 8.

An external device 278, for example a computer, is connected via a data line 279 to an input/output unit I/O 274 of μC 23. A target rotation speed n_s, for example, can be specified via computer 278 to the fan, and that speed is then stored in memory MEM 276. An output of data via motor 10 to the computer can also occur. Target rotation speed value n_s can also be determined via an NTC resistor 277 and an A/D converter 275 in combination with a temperature/rotation speed characteristic curve (not shown). Target rotation speed value n_s is delivered to rotation speed controller RGL_n 95 as a target value.

In this exemplifying embodiment a sensorless commutation is carried out, and inputs 230', 230", 230'" are connected via an evaluation apparatus 120 (depicted in FIG. 17) to terminal nodes 45, 55, 65 of winding arrangement 16 in order to ascertain, by way of an evaluation of the corresponding zero transitions of the induced voltage, the rotational position PHI of rotor 12 in the CALC_PHI routine 270, and the present rotation speed n_i in the CALC_n_i routine 271, these then being delivered to controller RGL_n 95 and to the COMMUT routine 280. Alternatively, rotational position PHI and rotation speed n_i can be ascertained, as in FIG. 1, with the aid of rotational position sensors 71, 72, 73.

Rotation speed n_i is delivered to rotation speed controller 95 as an actual value, and said controller ascertains a control input I_ave_s for control purposes.

The average current value target value I_ave_s is delivered to average current value controller RGL_I_ave 90 as a target value, and an average current value I_ave_i as an actual value, and the controller calculates therefrom a duty cycle TV for commutation arrangement COMMUT 280. Voltage U_38 characterizing current I_M in DC link circuit 20 is delivered via an input 231 to an A/D routine AD_I 272 that, for example at predetermined points in time, carries out an A/D conversion in order to generate a current value I_on. The value I_on, and a duty cycle TV' outputted by the COMMUT routine and usually corresponding to duty cycle TV, are delivered to the CALC_I_ave_i routine 92, and the CALC_I_ave routine 92 calculates, as a function of these values, the present average current value I_ave_i, which is delivered to average current value controller 90 as an actual value. Delivery of the duty cycle TV' allows any change in duty cycle TV as a result of the COMMUT routine 280 to be taken into account.

The absolute value of current I_on or I_ave_i is not necessary in many application instances, for example, superimposed rotation speed control, and it is then possible to work directly with voltage values U_87 and U_88 from FIG. 7.

The COMMUT routine 280 determines, as a function of rotational position PHI and duty cycle TV, which signals are outputted through outputs 241, 251, 261, 242, 252, 262 to switches 41, 51, 61, 42, 52, 62 (see FIG. 2, FIG. 3, and FIG. 5).

FIG. 17 shows a circuit for evaluating the signals at winding terminals 45, 55, 65 for carrying out a sensorless commutation. Terminal 45 is connected via a resistor 124 to a lead 121, and the latter via a resistor 125 to GND 32. Terminal 57 is connected via a resistor 126 to a lead 122, and the latter via a resistor 127 to GND 32. Terminal 65 is connected via a resistor 128 to a lead 123, and the latter via a resistor 129 to GND 32. Leads 121, 122, and 123 are connected to the positive inputs of comparators 131, 132, and 133, respectively, and via respective resistors 134, 135, and 136 to a lead 130.

Lead 130 is connected to the negative inputs of comparators 131, 132, and 133. The open collector outputs of comparators 131, 132, and 133 are connected to inputs 230', 230", and 230'", respectively, of μC 23, and a respective pull-up resistor 137, 138, 139 is provided at each of the outputs.

Resistors 124, 125 and 126, 127 and 128, 129 are implemented as voltage dividers, and divide the voltages at terminals 45, 55, 65 down in order to make possible processing using comparators 131, 132, 133. The voltages at leads 121, 122, and 123 are combined via resistors 134, 135, and 136 into one common voltage U_130 (average value) that corresponds to the voltage at a virtual neutral point in a neutral point winding arrangement. In comparators 131, 132, and 133, a comparison takes place between voltages U_121, U_122, and U_123, and voltage U_130. It is thus possible to read off, at inputs 230', 230", and 230'" of μC 23, whether voltages U_121, U_122, and U_123, respectively, are greater or less than voltage U_130, and the corresponding point in time of a change in the output signals of comparators 131, 132, and 133 can be ascertained by continuous monitoring or by an interrupt control system. FIG. 2, FIG. 3, and FIG. 5 indicate, by way of arrows 74, the terminal node 45, 55, and 65 at which a change at inputs 230', 230", and 230'", respectively, can be detected, and the direction in which that change is taking place.

Examples of values for the components used:

| | |
|---|---|
| Resistors 124, 126, 128 | 22 kilohm |
| Resistors 125, 127, 129 | 10 kilohm |
| Resistors 134, 135, 136 | 10 kilohm |
| Resistors 137, 138, 139 | 33 kilohm |
| Comparators 131, 132, 133 | LM2901 |

FIG. 18 shows a possible use of a PWM generator of a μC 23 in so-called center-aligned PWM mode, in which the pulse (S-I_on) is aligned at the center of the PWM period T_PWM.

In this exemplifying embodiment, the frequency of the PWM signal is 22 kHz, so that one PWM period T_PWM lasts 45 μs. During the first half (22.5 μs), a signal or value 140 is increased linearly with the aid of a PWM timer, and in the second half (22.5 μs) signal 140 is lowered linearly in the same fashion so that, after 45 μs, it has arrived again at zero. A second value 142 is used to determine the width of pulse 149 of the PWM signal. PWM signal 141 is always in the High state (Pulse or S-I_on) when signal 140 is greater than value 142. If it is less, on the other hand, PWM signal 143 is then in the LOW state 148, 150 (Pause, S-I_off1 or S-I_off2), as may be seen between times t_145 and t_146.

The value 142 is lower between times t_146 and t_147, and the consequence of this is that the pulse of PWM signal 143 becomes wider, and duty cycle TV thus becomes greater.

An advantage of this PWM mode is that some microprocessors, for example the PIC18F1330 of the MICROCHIP company, offer the capability, for example after half the PWM period T_PWM, of triggering an interrupt or calling an A/D conversion with a subsequent interrupt. The respective points in time are labeled 151. As a result, the measurement of voltage U_34 or U_38 can be carried at the center of pulse 149, as explained in the description of FIG. 6 and FIG. 7, or at any other point in the PWM period.

In order to allow an updating of value 142 before the next PWM period begins, thus making possible a fast and good average current value controller, the necessary steps in μC 23 must be carried out within a time span of 22.5 μs. With the aforementioned μC, A/D conversion lasts 12.5 μs, and calling the interrupt routine after completion of the A/D conversion takes 2 μs, so that less than 8 μs remain for calculating the new value 142. When using the PIC18F1330, which is clocked at 32 MHz, calculation of the new value 142, including average current calculation, control, and updating of duty cycle TV, must occur using a maximum of 60 one-cycle instructions. In the present case, this was possible only using assembler programming; the result of the A/D conversion was limited to 8 bits, and the maximum value of duty cycle TV was likewise limited to 8 bits. With a higher-performance μC, on the other hand, for example a digital signal processor (DSP), dsPIC33FJ12MC201, these optimizations are not absolutely necessary.

FIG. 19 schematically depicts the steps executing in μC 23.

PWM signal 143 is shown for the angle range from 0° el. to 60° el. with twelve-step commutation according to FIG. 3, using a four-pole rotor and a rotation speed n=5556 rpm=92.59 revolutions per second. One complete revolution of the rotor thus requires 10.8 ms. With a four-pole rotor, one complete revolution of the rotor corresponds to 720° el., and 30° el. thus corresponds to a time of (30/720)*10.8 ms=450 μs.

The PWM frequency is equal to 22 kHz, and the PWM period length is thus T_PWM=45 μs. At the already relatively high rotation speed of 5556 rpm, approximately 9 to 10 PWM pulses are therefore present in the electrical angle range of 30° el. PWM signal 143 is generated, as in FIG. 18, in center-aligned PWM mode, and after A/D conversion an LA interrupt is generated, thus calling a Low_ISR low-priority interrupt routine as shown in FIG. 21. An LT interrupt (low-priority interrupt—Timer0) generated every 100 μs by a Timer0 timer is also depicted, and this also calls the Low_ISR low-priority interrupt routine as shown in FIG. 21 in order to create a time base for the main program (FIG. 20).

Depicted above the LA and LT interrupt calls are the HT1 and HCOMP interrupt calls for calling the High_ISR high-priority interrupt routine according to FIG. 22. A determination is made, by way of the Timer1 timer, of the respective points in time t_160, t_161, and t_162 at which a commutation is to take place, and the respective commutation is initiated by generation of an HT1 interrupt of the Timer1 timer. The zero transition of the induced voltage at the points labeled 74 in FIG. 3, and in FIG. 19 at time t_163, is additionally sensed with the aid of the HCOMP interrupt, which is generated by a predetermined change in the signal at the corresponding selected input 230', 230", 230'" with the aid of the circuit according to FIG. 17. Once the zero transition of induced voltage 165 is sensed at time t_163, the present rotor position is known, and the time between the zero transition of induced voltage 165 and the next commutation at time t_162, and thus also the "ignition advance" time, are defined by way of a time COM_TIME.

The cooperation between a normal current controller RGL_I_ave_1 and two special current controllers RGL_I_ave_2 and RGL_I_ave_3 is controlled via a so-called delay counter DELAY_CNT, for improved compensation for the current gaps after a commutation by switching-off of an upper or a lower switch.

Upon commutation at time t_160 (transition from state 10 to state 11), FIG. 3 shows that lower switch 42 is additionally switched on. Because the switching of an additional switch does not lead to a current gap, normal current controller RGL_I_ave_1 can be used without interruption before and after this commutation, and switch 42 is simply switched on additionally.

At time t_160, in the High_ISR high-priority interrupt routine, the Timer1 timer is set to a value BEMF_TIME, and after that time has elapsed, an HT1 interrupt is triggered at time t_161 and the next commutation from state 11 to state 0 takes place. Because (as shown in FIG. 3) a zero transition of induced voltage 165 is always ascertained after 60° el, time BEMF_TIME is obtained, for example, by calculating half the time between two successive zero transitions 74 of induced voltage 165, and that time is correspondingly calculated at time t_163 (CALC BEMF_TIME). Alternatively, the duration for 60° el. can also be calculated by adding the time lengths BEMF_TIME, T_MEAS, and COM_TIME at time t_162.

In state 11, a check is made at each LA interrupt as to whether the next commutation at time t_161 is imminent. If so, current controller RGL_I_ave_1 is disabled (DISABLE RGL_I) and LA interrupts are also disabled (DISABLE LA), since they are correspondingly no longer needed, and since the A/D converter can then be used for other purposes.

In the context of the commutation at time t_161, lower switch 62 is switched off in the High_ISR interrupt routine (see FIG. 3), and this results in a current gap, since the current that is flowing through upper switch 51, strand 48, and lower switch 42 cannot, because of the inductance of the strand, be increased immediately in order to compensate. In order to keep current I_M as constant as possible after commutation, the PWM_TIMER PWM timer is restarted at commutation so that it is synchronized with the commutation.

In addition, the DELAY_CNT variable is set to a starting value DELAY_CNT_START of, for example, 4; the LA interrupt is enabled again (ENABLE LA); duty cycle TV is set, for the first PWM period (DELAY_CNT==4) to a value PWM_LOW previously calculated by controller RGL_I_ave_3; and current control is enabled again (ENABLE RGL_I). Control of the average current value I_ave can be considerably improved by carrying out a special control operation after this commutation, since the normal controller would be overwhelmed in terms of control engineering with the extreme change after commutation, and control would therefore be poorer.

At the LA interrupt occurring during the first PWM period (DELAY_CNT==4), a duty cycle TV_START for the second PWM period (DELAY_CNT==3) is specified in the Low_ISR interrupt routine to the normal current controller RGL_I_ave_1 in order to initialize it, and duty cycle TV is set to that value, duty cycle TV_START being specified by a starting value controller RGL_TV_START. The DELAY_CNT variable is lowered to three.

At the LA interrupt occurring during the second PWM period (DELAY_CNT==3), sensing of the zero transition of induced voltage 165 is started (BEMF_SENSE_START). The purpose of starting sensing after commutation is to prevent incorrect sensing of the zero transition of induced voltage 165 from taking place as a result of commutation interferences. Normal current controller RGL_I_ave_1 is called, in order to calculate the duty cycle for the third PWM period (DELAY_CNT==2), and special controller RGL_I_ave_3 is called, in order to control or improve the specified value PWM_LOW as a function of the present system deviation of the current controller. If the present system deviation I_ave_s--I_ave_i is equal to zero, the current gap is being effectively controlled with the PWM_LOW duty cycle. A new starting value is thus available for the next commutation when a lower switch is switched off.

At the LA interrupt occurring during the fourth PWM period (DELAY_CNT==1), a controller for determining the starting value for duty cycle TV_START is implemented, and said controller calculates the starting value for initializing average current value controller RGL_I_ave_1 for the first PWM period.

At the zero transition of induced voltage 165 at time t_163, the HCOMP interrupt is generated; and in the associated High_ISR interrupt routine, the present time t_COMP is stored (STORE t_COMP) so that at the next zero transition the time difference can be determined; the value BEMF_TIME for the time required for 30° el. can be calculated by calculating half the time length calculated (as indicated above) for 60° el. The value COM_TIME, for the time between the present zero transition at time t_163 and the next commutation t_162, is calculated, and the Timer1 timer is set accordingly. The ignition advance is also determined by way of COM_TIME, and in a simple exemplifying embodiment this time can be selected to be constant; the result of this is that a small ignition advance takes place at low rotation speeds, and a large advance at high speeds.

In the upper section a MOTSTATE motor variable having corresponding values (28, 14, 12, 30, and 22) is indicated, and the High_ISR interrupt routine stores the present state of the motor, using these state variables.

An advantage of this sensorless twelve-step commutation is that measurement of the zero transitions of the induced voltages is carried out, in the winding terminals 45, 55, and 65 predetermined by the respective angle region, only in six of the twelve commutation periods. When six-step commutation is used for startup, this makes possible a simpler program structure, and thus a more economical processor.

FIG. 20 shows the main program main( ), FIG. 21 the Low_ISR low-priority interrupt routine, and FIG. 22, FIG. 22A, FIG. 22B, FIG. 22C, FIG. 22D, and FIG. 22E show the High_ISR high-priority interrupt routine, which together make possible a twelve-step commutation for an input-current-controlled sensorless fan.

The meanings of the symbols used in all the flow charts are:
=Allocate
==Compare for identity
−=Decrement by a value of 1
N/NO No
Y/YES Yes
Comm. Commutation type
6S Six-step commutation
12S Twelve-step commutation
DIR Rotation direction
FW Forward (e.g. clockwise) rotation direction
BW Backward (e.g. counterclockwise) rotation direction
pos. Positive
neg. Negative
init. Initialize
Comp. Comparator The main program begins in step S400. In step S402, the µC is initialized, the Mainstate state variable of a state machine is set to a value of zero, the Timer0 timer is initialized so that every millisecond it triggers an interrupt that is processed by the Low_ISR routine S500. The Timer1 timer is initialized in such a way that when it overflows, an interrupt is triggered that is processed by the High_ISR interrupt routine S600. A DELAY_CNT_START variable is initialized to a value between 3 and 5, and this value is used as a starting value for a DELAY_CNT delay counter that determines the delay between an even-numbered commutation and the start of BEMF sensing.

The main loop begins in step S404, and the Maintimer timer is set to 100. This determines that the main loop will be cycled through every 100 ms as a function of the Timer0 timer. Step S406 checks whether Mainstate has a value of 2. If Yes, in step S408 execution waits for ADC release of the A/D converter by current controller I_RGL, since the A/D converter of the µC is used for both tasks and thus cannot perform the tasks simultaneously. Execution then branches to step S410. If the response in step S406 is No, execution branches directly to step S410. In step S410, a value CTRL_VAL is read in via the A/D converter; this value is specified, for example, by an external or integrated NTC resistor, a control voltage from 0 to 10 V, or an external PWM signal. In step S412 link circuit voltage UZK is sensed with A/D converter ADC. In step S414, the target rotation speed n_s is calculated, for example by means of a temperature/rotation speed characteristic curve, from the value CTRL_VAL.

Step S416 then checks the Mainstate state of the main program. If the Mainstate state is equal to 0 (target rotation speed n_s is so far equal to zero), execution then branches to step S418. Step S420 checks whether the value UZK for the link circuit voltage is in the permitted range. If No, execution branches directly to step S480. If Yes, step S422 then checks whether target rotation speed n_s is greater than zero. If No, execution branches to step S480. If Yes, the Timer1 timer for startup of the motor is initialized in step S424. Duty cycle TV for the PWM signal is set for startup. Step S428 defines that a six-step commutation is to be carried out for startup.

In step S430, the Startup variable is then set to 1, the Motstate state variable to 6, and the Mainstate state variable to 1. Execution then branches to step S480.

If, however, the Mainstate state in step S416 is equal to 1 ("Startup" state), execution then branches to step S440. Step S442 checks whether the startup rotation speed n_start has already been reached. If No, execution branches to step S452 and the duty cycle TV of the PWM signal is increased. If Yes, execution branches to step S444, where the Startup value is set to zero. Twelve-step commutation is then enabled in step S446, the Mainstate state is set to 2 ("Control" state) in step S448, and current controller RGL_I_ave_1 is enabled in step S450. Execution then branches to step S480.

If the Mainstate state was equal to 2 in step S416 ("Control" state), execution then branches to step S460. Step S462 checks whether target rotation speed n_s is greater than a shutdown rotation speed n_stop. If No, in step S468 the Mainstate state is set to 3 ("Shutdown" state) and execution branches to step S480. If Yes, execution branches to step S464, where rotation speed controller RGL_n (95 in FIG. 16) is executed. In the rotation speed controller, the system deviation is calculated from the difference between target rotation speed n_s and actual rotation speed n_i, and delivered to an I-controller (integral controller). The control input that is ascertained is limited if applicable, and then delivered to the current controller as target value I_ave_s.

In step S466, A/D conversion of voltage U_38 at the center of the PWM pulse is then enabled, and branching to S480 occurs. The current controller of FIG. 21 is thus not enabled until the motor is running, since it functions poorly or not at all when the motor is stationary.

If the Mainstate state in step S416 was equal to 3 ("Shutdown" state), execution then branches to step S470. In step S472, the Motstate state is set to 2, and the Mainstate state to zero. In step S474 the current controller is then disabled, and execution branches to step S480. Step S480 checks whether the Maintimer value has a value of zero, i.e. whether the Timer0 timer, which decrements the Maintimer value by 1 every millisecond, has already been called a hundred times. If No, execution continues to wait and branches to step S480. If Yes, then 100 ms have elapsed since the last call of the main loop beginning in step S404, and execution branches back to step S404.

FIG. 21 shows the Low_ISR interrupt routine S500.

Step S502 identifies the reason why interrupt routine S500 was triggered. In the event of a triggering by the Timer0 timer, execution branches to step S504, the Maintimer timer is decreased by 1 in step S506, and execution leaves the interrupt routine in step S508. The result is that the Maintimer value used to time the main program is decremented after every millisecond.

If, on the other hand, the interrupt was triggered after completion of a requested A/D conversion (initialized in step S466, FIG. 20), execution then branches from step S502 to step S510, where the value I_on characterizing the present current is ascertained by A/D conversion. Step S512 checks whether the DELAY_CNT delay counter has the value DELAY_CNT_START. If No, then in step S516 the value I_ave_i is calculated from the measured current value I_on and the duty cycle TV'. The normal current controller RGL_I_ave_1 is then called in step S518, and in said controller the system deviation e1 is calculated from target value I_ave_s and actual value I_ave_i, and delivered to an I-controller (or, for example, also to a P-(proportional) or P-I-(proportional-integral) controller). The control input is then limited as applicable, duty cycle TV for the PWM signal is updated, and execution branches to step S520.

If, on the other hand, the value DELAY_CNT was equal to the value DELAY_CNT_START in step S512 (which is the case directly after a commutation from an odd-numbered state to an even-numbered state), execution then branches to step S514, where duty cycle TV is set to the starting value TV_START and execution then branches to step S520. In simpler microprocessors, program steps S516 and S518 must be written in the assembler for speed reasons.

Step S520 checks the DELAY_CNT delay counter, and execution branches to one of steps S522, S530, S550, S560, or S570 as a function of the check. Execution branches to step S522 when the DELAY_CNT delay counter has the same value as DELAY_CNT_START. In step S524 the DELAY_CNT value is decreased by 1 and execution then leaves the interrupt routine in step S526. At the next pass through the interrupt routine, the DELAY_CNT variable has the value DELAY_CNT_START minus 1, and execution branches to step S530. In step S532, sensing of the induced BEMF (back electromagnetic force) voltage is started, and a determination is made of the zero transition (from + to − or vice versa, winding terminal 45, 55, or 65 [see FIG. 3]) at which an HCOMP interrupt is triggered. In step S534 the DELAY_CNT variable is decreased by 1, and step S536 then checks whether one of the upper switches 41, 51, 61 was switched off in the context of commutation from an odd-numbered state to an even-numbered state. If Yes, a controller RGL_I_ave_2 is called in step S538. This controller is one optimized for the current gap occurring after a commutation. The present system deviation e1 of current controller RGL_I_ave_1 is used as system deviation e2, and this is delivered to an optimized I-controller. A limitation of control input PWM_HIGH then occurs as applicable, and said input is used after the next corresponding commutation as a control input for the first PWM period.

If, on the other hand, the response in step S536 was NO, execution then branches to step S540 where current controller RGL_I_ave_3, which is optimized for controlling in the context of a current gap occurring after commutation from an odd-numbered state to an even-numbered state, with switch-off of one of the lower switches 42, 52, 62, is called. The present system deviation e1 of current controller RGL_I_ave_1 is used as system deviation e3, and this is delivered to an optimized I-controller.

The control input PWM_LOW is limited as applicable, and is used after the next corresponding commutation as a control input for the first PWM period. Execution then leaves the interrupt routine in step S542.

The next time routine S500 is called, the DELAY_CNT variable is still greater than 1, and execution branches from step S550 to step S552 and the DELAY_CNT variable is decreased by 1. This produces a further delay. Execution then leaves the interrupt routine in step S554.

If the DELAY_CNT variable has a value of 1 at one of the subsequent calls, execution then branches from step S520 to step S560, and in step S562 a controller RGL_TV_START is then called, in which a starting value e1 for current controller RGL_I_ave_1 S518 is ascertained with the aid of a controller. For this, the difference between duty cycle TV and the previous starting value TV_START of the current controller is determined as a system deviation, and delivered to an I-controller. The resulting control input is then limited as applicable, and allocated to the TV_START variable. In step S564 the DELAY_CNT variable is set to zero, and in step S566 execution leaves the interrupt routine.

The next time interrupt routine S500 is called, execution branches from step S520 to step S570, since the DELAY_CNT variable has a value of zero. Step S572 checks whether the next commutation is an even-numbered commutation. If No, execution immediately leaves the interrupt routine in step S580. If Yes, step S574 checks whether the Timer1 timer is about to overflow, for example, by checking whether the Timer1 timer is greater than a predetermined value. If No, execution leaves the routine in step S580. If Yes, then in step S576 current controller I_CTRL is disabled, and in step S578, the A/D converter for the main program is released so that with it, the value CTRL_VAL in step S410 and then the value UZK for the link circuit voltage in step S412 can be measured in the main program. No further current control takes place until the next commutation. This has only a minor influence on input current I_IN, I_M, since changes in the current shortly before commutation are minor. Execution then leaves the interrupt routine in step S580.

FIG. 22 shows the High_ISR interrupt routine S600 for an input-current-average-value-controlled fan with sensorless twelve-step commutation and six-step commutation for startup, with forward and backward operation. Step S602 checks the Motstate state variable, and as a function of its value execution branches to one of steps S604, S610, S616, S640, S676, S700, S736, S760, S796, S830, S866, S890, S926, S950, S1000, S1020, S1040, S1060, S1080, or S1100. If the Motstate state variable has a value of zero ("Fan off" state), execution branches from step S604 to step S606, and all the power stage transistors 41, 51, 61, 42, 52, 62 are switched off. Execution then leaves the interrupt routine in step S608.

If the Motstate state variable has a value of 2 ("Brake fan" state), execution branches from step S610 to step S612, and the upper power stage transistors 41, 51, 61 are switched off. The lower power stage transistors 42, 52, 62 are then switched on in step S614 in order to produce current looping in the lower portion of the power stage, and to decrease the current in stator arrangement 16. Execution leaves the interrupt routine in step S615.

If the Motstate state variable has a value of 4 ("BEMF sensing A positive" state), execution branches from step S616 to step S618, which checks whether a positive signal is present at the comparator at which the induced voltage is compared. If YES, branching to step S620 occurs; if NO, branching to step S634. Step S620 checks the rotation direction. If the rotation direction is forward, then in step S622 the Motstate state variable is set to 34 and execution branches to step S630. If, on the other hand, the rotation direction is backward, execution branches to step S624. Step S624 checks as to which type of commutation is to be carried out. In the case of a six-step commutation, the Motstate state variable is set to 36 in step S626. If a twelve-step commutation is to be performed, the Motstate state variable is set to 38 in step S628. Execution then branches to step S630, in which a calculation of the BEMF and COM times occurs; and execution leaves the interrupt routine in step S632. Step S634 checks the value of the Startup variable. If the value is 1 (startup operation), then in step S636 the Timer1 timer for startup is initialized and execution then branches to step S620.

If, on the other hand, the value is zero, execution leaves the interrupt routine in step S638.

If the Motstate state variable has a value of 6 in step S602 ("Start BEMF sensing A positive" state), execution branches to step S640 and step S642 then checks which type of commutation is to be carried out. For a six-step commutation, branching occurs to step S644 and BEMF sensing A positive is started. The Motstate state variable is then set to 4 in step S648, and execution leaves the interrupt routine in step S650. If, however, the check in S642 sets a twelve-step commutation, step S646 then determines that this is an even-numbered commutation, i.e. a change from the odd-numbered state=3 to the even-numbered state=4. The rotation direction is then checked in step S652. If it is forward, the State variable is then set to 4 in step S654, and execution then branches to step S660. If, on the other hand, the rotation direction is backward, then in step S656 the State variable is set to 10 and execution branches to step S660. Step S660 prepares "BEMF sensing A positive", i.e. defines that an HCOMP interrupt (FIG. 19) is to be triggered when the output signal of comparator 131 (FIG. 17) changes from LOW to HIGH. In step S662 the Motstate state variable is set to 4. In step S664 duty cycle TV is set to the value PWM_LOW (PWM_LA_LB_LC_AUS) of controller RGL_I_ave_3). In step S666, the PWM timer for output of the clocked signal to the power stage is then started with the new duty cycle TV. In step S668, the DELAY_CNT variable is set to the value DELAY_CNT_START in order to execute the corresponding steps, starting at step S520, in interrupt routine S500. In step S670 the current controller is enabled, and execution then leaves the interrupt routine in step S672. The sequences in steps S676 to S950 function analogously for the remaining commutation steps, and are therefore not described individually.

If the Motstate state variable has a value of 28 in step S602, branching to step S1000 ("Commutation" state 11) occurs. Step S1002 checks how commutation is to be performed. For a six-step commutation, the State variable is set to zero in step S1004, and execution branches to step S1008.

For a twelve-step commutation, the State variable is set to 11 in step S1006, thereby modifying the current flow through power stage 16 according to FIG. 3 with no need to restart the clocked signal. Execution then branches to step S1008, where the rotation direction is ascertained. If forward, the Motstate state variable is set to 14 in step S1010, and if backward the Motstate state variable is set to 6 in step S1012. The Timer1 timer is then loaded, in step S1014, with the BEMF time. Execution leaves the interrupt routine in step S1016. Steps S1020 to S1100 function analogously for the corresponding states, and are therefore not described again.

For illustration, the sequence according to FIG. 19 will be described briefly with reference to the High_ISR routine S600. At time t_160, the High_ISR routine S600 is called. The Motstate state is equal to 28, and branching occurs to step S1000. Because a twelve-step commutation is carried out in the forward direction, in step S1006 the commutation state is set to State 11 (see FIG. 3) so that lower switch 42 is additionally switched on. The Motstate state variable is set to 14 in step S1010, and in step S1014 the Timer1 timer is set to the BEMF time until the next commutation. Execution then leaves the High_ISR routine.

The next Timer1 interrupt follows at time t_161, and in the High_ISR routine execution branches to step S760 (Motstate=14). In step S774 the commutation state is set to 0, with the result that (according to FIG. 3) the state of switch 62 is set from conductive (HIGH) to non-conductive (LOW). Because, according to FIG. 3, the zero transition to be detected in the induced voltage in branch C takes place from negative to positive, sensing is correspondingly initialized in step S780 so that an HCOMP interrupt (FIG. 19) is triggered at such a transition. In step S780 the Motstate state variable is then set to 12, in step S784 the duty cycle for the first PWM period is set to the starting value PWM_LOW of controller RGL_I_ave_3, in step S786 the PWM timer is restarted, in step S788 the DELAY_CNT counter is set to a value of 4, and in step S790 current controller RGL_I_ave_1 is enabled. Execution leaves the routine in step S792.

At the change in induced voltage 165 at time t_163, the High_ISR routine S600 is once again called by the HCOMP interrupt, and execution branches to step S736 (State=12). In step S746 the Motstate state variable is set to 30, in step S753 the time values BEMF Time and COM Time are calculated, and execution then leaves the routine in step S754.

At the subsequent Timer1 interrupt, execution in the High_ISR routine S600 branches to step S1020, and the next commutation occurs.

FIG. 23 shows a measurement of voltage U_34 at measuring resistor 36 (FIG. 1), and input current I_IN (FIG. 1) for an input-current-controlled fan with twelve-step commutation, U_B=48 V, power P=100 W, and rotation speed n=7700 $min^{-1}$.

At times t_170 and t_175, a respective commutation takes place from an odd-numbered state (State 1, 3, 5, 7, 9, 11) to an even-numbered state (State 0, 2, 4, 6, 8, 10), and it is evident that at this high rotation speed, after the commutation operation, a duty cycle TV of 100% is specified respectively for two entire PWM periods in order to minimize the current gaps. At time t_176 a commutation takes place from an even-numbered state (State 0, 2, 4, 6, 8, 10) to an odd-numbered state (State 1, 3, 5, 7, 9, 11). Because an upper or a lower switch is additionally switched on in the context of this type of commutation, no current gap is created.

Input current I_IN is largely constant during time periods T_171 and T_173, but after the commutation operations at times t_170 and t_175 it rises during a time T_172. This can be referred to as an overshoot of input current I_IN. This overshoot is not sensed by measuring resistor 36 (FIG. 1), since the additional current flows into link circuit capacitor 22 as current I_C (FIG. 1). An improvement in control can be improved by an additional current measuring element for measuring the current I_C or I_C' flowing into storage arrangement 22, and by taking the measured values into consideration with regard to current control, if this is necessary for the electric motor's application.

FIG. 24 shows the use of a Pi filter between voltage source U_B and DC link circuit 20. Electrolytic capacitor 22 stabilizes the DC link circuit as in FIG. 1, and coil 21 and electrolytic capacitor 22' form the Pi filter. The Pi filter is a bidirectional filter that damps the so-called differential mode proceeding from the motor.

Examples of values for the components:

| | |
|---|---|
| Capacitors 22, 22' | 220 μF, max. 75 V |
| Coil 21 | 33 μH, max. 3 A. |

A reduction in line-conducted emissions is achieved with the use of the Pi filter. Accommodating the additional components on a circuit board is, however, difficult in some cases for space reasons, and the resulting costs are higher than without a Pi filter.

FIG. 25 shows a further possibility for driving power stage 16. This involves a twelve-step commutation in the forward direction. Unlike in FIG. 3, the switching off of an upper or lower switch does not occur completely at the moment of commutation, but instead the corresponding switch is switched off slowly by decreasing the duty cycle, for example over an angle range of 30° el., from one PWM period to another.

For example, duty cycle TV* of driving signal PWM* is decreased, in ramped fashion in each case, in the range from 60° el. to 90° el. for switch HB, in the range from 180° el. to 210° el. for switch HC, and in the range from 300° el. to 330° el. for switch HA, in this case e.g. in steps of approximately TV*=70%, 52.5%, 35%, and 17.5%. The corresponding lower switches are driven with the inverse signal /PWM*.

The switching off of lower switches LA, LB, LC occurs similarly in ramped fashion, and duty cycle TV of driving signal PWM, which in the case of the lower, switched-on switches was consistently 100% switched on, is reduced in ramped fashion in the range 0° el. to 30° el. for switch LC, in the range from 120° el. to 150° el. for switch LA, and in the range from 240° el. to 270° el. for switch LB, in this case e.g. in steps TV**=90%, 67.5%, 45%, 22.5%.

This type of commutation with a "smooth shutdown" requires that the corresponding switches 41, 51, 61, 42, 52, 62, and the three bridge branches 40, 50, 60 of power stage 18, be capable of being driven with different duty cycles TV, TV*, TV**.

In the case where the PWM signals are generated in a µC 23, it is preferred to use a µC 23 in which the duty cycle at the corresponding outputs 241, 251, 261, 242, 252, 262 is adjustable. Slow shutdown allows current controller RGL_I_ave 90 (FIG. 8) to increase the current slowly in the corresponding second energized strand already before commutation, and control in the context of commutation with shutdown of an upper or lower switch is thereby greatly improved. A further advantage of this driving mode is that as compared with driving without "smooth shutdown," windings 48, 58, 68 having more wire windings, and thus having a higher inductance, can be used, since the current in the corresponding second strand does not need to be built up suddenly. Since no current gap, or only a very small one, is created with this type of commutation, a motor (10) of this kind can be operated with only one current controller. Special compensation for the current gap, in particular, can be omitted.

Smooth shutdown can be brought about, for example, by counting the number of PWM periods for each 30°-el. time period in the Low_ISR interrupt routine (FIG. 21) using a PWM_COUNTER, and then, for example in the case of the shutdown of switch HB in the range from 60° el. to 90° el., calculating for the commutation at 60° el. a value DELTA_TV from the present duty cycle TV and the PWM_COUNTER value, as follows:

DELTA_TV=TV/PWM_COUNTER.

It is then possible, for each PWM period in the corresponding call of the Low_ISR routine for current control, to decrease the duty cycle for the corresponding switch by the value DELTA_TV.

A linear ramp is thereby implemented.

The respective duty cycles TV and TV* of PWM signals PWM and PWM* of upper switches 41, 51, 61 differ in the angle ranges of States 1, 5, and 9. When the PWM signals are generated in center-aligned mode, however, both PWM signals have a pulse in the context of a duty cycle greater than zero, and a measurement of voltage U_34 or U_38 at this point in time still yields a good approximation of average value U_37 87 of voltage U_38 during the pulse. In order to calculate average value U_88 for the entire PWM period, value U_87 is then, to a good approximation according to equation (7), multiplied by the duty cycle TV of the particular switch that is not being shut down in ramped fashion.

Examples of Possible Modifications

Numerous modifications are of course possible, within the scope of the invention. The current measuring resistor or current measuring element 36 can also be arranged in upper lead 30, and can measure input current I_M there; care must be taken that none of the potentials corresponds to GND potential.

Current measuring element 36 can also be arranged outside DC link circuit 20, i.e. in FIG. 1 to the left of link circuit capacitor 22, in order to measure current I_IN or I_IN'. The advantage of this is that, in order to reduce the line-conducted emissions, it is precisely current I_IN or I_IN' that should be as constant as possible. It is disadvantageous, however, that the link circuit capacitor serves as an energy reservoir, which results, in terms of control engineering, in a delay that degrades control via power stage 18, used as a setting element.

The current flowing in power stage 16 can also be ascertained by measuring the currents flowing in the individual branches; the currents flowing in the strands during current looping must then not be taken into account computationally or by way of an electronic circuit.

Torque control is also possible with the motor, since the torque is proportional to the current through the winding. For this, the target current value I_ave_s corresponding to the desired torque is specified, and multiplication by duty cycle TV' is omitted when calculating the actual current value I_ave_i in S516.

The invention claimed is:
1. A method of operating an electronically commutated motor (10) that comprises:
a rotor (12);
a stator (14) having a multi-strand winding arrangement (16) for whose energization
a power stage (18) is provided;
a first lead (30) and a second lead (32) for connecting power stage (18) of said motor to a voltage source (24), and
a first controller (23) controlling power applied to said power stage (18),
said method comprising the steps of:
A) sensing a first signal (U_34; U_38) which, during operation, characterizes a current (I_IN; I_IN'; I_M; I_M') flowing through at least one of said first and second leads (30; 32);
B) as a function of the first signal (U_34; U_38), ascertaining a first value (I_ave_i) which characterizes an average value of the current (I_IN; I_IN'; I_M; I_M') flowing through at least one of the leads (30; 32);
C) in the first controller, generating a first control signal (TV), based upon the first value (I_ave_i) applied to an input of said controller as an actual value, and a second value (I_ave_s) applied to an input of said controller as a target value;
D) generating (280) at least one clocked signal (PWM; PWM*; PWM**) as a function of the first control signal (TV), and
E) applying said at least one clocked signal to the power stage (18), in order to influence the first value (I_ave_i)

and to thereby reduce fluctuations of said average value of the current flowing through at least one of the leads.

2. The method according to claim 1,
wherein the motor includes an analog-to-digital converter and further comprising the steps of
applying, at a plurality of times, said first signal (U_34; U_38) to an input (231) of said converter (272, 92) and
generating therefrom, at a plurality of times, corresponding digital output values, the first value (I_ave_i) being ascertained by averaging (92) the plurality of digital output values.

3. The method according to claim 1,
wherein the first value (I_ave_i) is ascertained in such a way that it characterizes the average value of the current (I_IN; I_IN'; I_M; I_M') flowing through at least one of the leads (30; 32) during a predetermined time segment (T_PWM).

4. A motor (20) comprising
a permanent magnet rotor (12),
a stator (14) with a multi-strand winding arrangement (16) equipped with winding terminals (45, 55, 65);
a power stage (18) for powering said multi-strand winding arrangement, said power stage having a first lead (30) and a second lead (32) for connecting the power stage (18) to a DC voltage source (24),
an upper switch (41, 51, 61) connected intermediate said first lead (30) and said terminals (45, 55, 65), and
a lower switch connected intermediate said second lead (32) and said terminals (45, 55, 65);
a current measuring element (36) adapted for measuring a first voltage signal (U_34; U_38) characterizing the current (I_IN; I_IN'; I_M; I_M') flowing through at least one of said first and second leads (30, 32),
a first apparatus (272, 92) adapted to ascertain, as a function of the first voltage signal (U_34; U_38), a first value (I_ave_i) characteristic of the average value of the current (I_IN; I_IN'; I_M; I_M') flowing through at least one of the leads (30, 32),
said first apparatus includes an analog-to-digital converter which, during motor operation, receives said first voltage signal (U_34; U_38) and generates therefrom a corresponding digital output value (I_on) and said first apparatus is configured to specify the duty ratio (TV) of a clocked signal (PWM) during a period of the clocked signal, as a function of a value characteristic of an average value of current flowing in one of said leads (30,32) during a preceding predetermined time span of the clocked signal (PWM);
said motor (20) being so configured that, during operation, a clocked signal applied to said upper switch (41, 51, 61) has a first state (S-I_on) during a first time interval and a second state (S-I_off) during a second time interval, a current being permitted to flow only during said first state (S-I_on) via said first lead (30), a corresponding upper switch (41, 51, 61), and said second lead (32);
said first apparatus (272, 92) during said first time interval (T_I_on) performing an analog-to-digital conversion of first signal (U_34, U_38) and, as a function of the result, supplying said first value (I_ave_i);
further comprising
a first controller which receives, as inputs, the first value (I_ave_i) as an actual value and a second value (I_ave_s) as a target value, and generates therefrom, at its output, a first control value (TV), and
a first control apparatus (280) having an input coupled to receive said first control value (TV), and an output supplying a clocked signal for application to an input of said power stage (18), in order to influence said first value (I_ave_i) and thereby to reduce fluctuations of said average value of the current flowing through at least one of the leads.

5. The motor according to claim 4, further comprising
a capacitor (22) arranged between said first lead (30) and said second lead (32) and
wherein said current measuring element (36) is associated with a segment of the leads (30, 32) between said capacitor (22) and power stage (18).

6. The motor according to claim 4, further comprising
a capacitor (22) arranged between said first lead (30) and said second lead (32) and
wherein said current measuring element (36) is associated with a segment of the leads (30, 32) coupled to a power-stage-remote side of said capacitor (22).

7. The motor according to claim 4, further comprising a circuit (23), active during commutation steps which shut off a switch, performing multiple successive reductions of a duty cycle of a clocked signal (PWM; PWM*, PWM**) applied to said switch (41, 51, 61, 42, 52, 62), in order to achieve a gentle switching-off of current applied to windings of said motor.

8. The motor according to claim 4, wherein
said first apparatus (272, 92), said first controller (93, 90) and said first control apparatus (280) are implemented within a microcontroller (23) using a program associated therewith.

9. The motor according to claim 4,
wherein said power stage (18) serves as a setting element for said first controller (93, 90).

10. The motor according to claim 4, wherein said first apparatus (272, 92) ascertains said first value (I_ave_i) dynamically in real time, prior to each expiration of a predetermined recurring time limit (T_PWM).

11. The motor according to claim 10, wherein said first apparatus ascertains said first signal within said predetermined time limit by performing analog-to-digital conversion.

12. The motor of claim 4, wherein, subsequent to a commutation in which any of said upper and lower switches has been switched off, said clocked signal is started anew.

13. The motor of claim 12, further comprising a third controller which specifies a starting value of the duty ratio for the restarted clocked signal.

14. The motor of claim 4, further comprising
a second controller (95) used to regulate the instantaneous motor speed (n_i) toward a target motor speed (n_s),
said second controller generating a second control value (I_ave_s) which is applied to the first controller (90) as said second value (I_ave_s) thereto.

15. A motor (20) comprising
a permanent magnet rotor (12),
a stator (14) with a multi-strand winding arrangement (16) equipped with winding terminals (45, 55, 65);
a power stage (18) for powering said multi-strand winding arrangement, said power stage having a first lead (30) and a second lead (32) for connecting the power stage (18) to a DC voltage source (24),
an upper switch (41, 51, 61) connected intermediate said first lead (30) and said terminals (45, 55, 65), and
a lower switch connected intermediate said second lead (32) and said terminals (45, 55, 65);
a current measuring element (36) adapted for measuring a first voltage signal (U_34; U_38) characterizing the current (I_IN; I_IN'; I_M; I_M') flowing through at least one of said first and second leads (30, 32),
a first apparatus (272, 92) adapted to ascertain, as a function of the first voltage signal (U_34; U_38), a first value (I_ave_i) characteristic of the average value of the current (I_IN; I_IN'; I_M; I_M') flowing through at least one of the leads (30, 32), said first apparatus includes an analog-to-digital converter which, during motor operation, receives said first voltage signal (U_34; U_38) and generates therefrom a corresponding digital output value (I_on)

wherein a clocked signal applied to the upper switch (41, 51, 61) has a first state S_I_on) during a first time interval (T_I_on) and a second state S_I_off) during a second time interval (T_I_off) a current being permitted to flow via the first lead (30), a corresponding upper switch (41, 51, 61), and the second lead (32) only during said first state (S_I_on), a third value (87) is generated, characterizing an average value of said first voltage signal (U_34, U_38) during said first state (S_I_on), and the first value (I_ave_i) is ascertained as a function of the third value (87), a first time duration (T_I_on) and a second time duration (T_I_off);

said first apparatus (272, 92), during said first time interval (T_I_on), performing an analog-to-digital conversion of said first voltage signal (U_34, U_38) and, as a function of the result, supplying said first value (I_ave_i); and further comprising a first controller (93, 90) which receives, as inputs, the first value (I_ave_i) as an actual value and a second value (I_ave_s) as a target value, and generates therefrom, at its output, a first control value (TV), and a first control apparatus (280) having an input coupled to receive said first control value (TV), and an output supplying a clocked signal for application to an input of said power stage (18), in order to influence said first value (I_ave_i) and thereby to reduce fluctuations of said average value of the current flowing through at least one of the leads.

16. The motor of claim 15, wherein said first value (I_ave_i) is obtained by multiplying said third value (87) by the duty ratio (TV) of the clocked signal (PWM) applied to the corresponding upper switch (41, 51, 61).

17. The motor of claim 15, wherein the third value (87) is obtained by measuring the first signal at a predetermined first time instant (t_81'; t_83') which corresponds to an average value of the first voltage signal (U_34; U_38) in the first state.

18. The motor of claim 17, wherein said first time duration (T_I_on) is variable, and the first instant lies within a range of 30% to 70% of the first time duration (T_I_on).

\* \* \* \* \*